United States Patent
Pavesi et al.

(10) Patent No.: US 6,549,536 B1
(45) Date of Patent: Apr. 15, 2003

(54) METHOD OF ADDRESS COMPRESSION FOR CELL-BASED AND PACKET-BASED PROTOCOLS AND HARDWARE IMPLEMENTATIONS THEREOF

(75) Inventors: Marco Pavesi, Vigevano (IT); Riccardo Gemelli, San Colombano/L. (IT)

(73) Assignees: Italtel S.p.A., Milan (IT); Siemens Mobile Communications S.p.A., Milan (IT)

( * ) Notice: Subject to any disclaimer, the term of this patent is extended or adjusted under 35 U.S.C. 154(b) by 0 days.

(21) Appl. No.: 09/364,073

(22) Filed: Jul. 30, 1999

(51) Int. Cl.$^7$ .......................... H04L 12/28; H04L 12/56
(52) U.S. Cl. .................... 370/395.31; 370/401
(58) Field of Search ................ 370/351, 389, 370/392, 401, 476, 473, 413, 402, 403, 471, 395.1, 398, 399, 395.31, 395.32; 709/200; 711/201, 202

(56) References Cited

U.S. PATENT DOCUMENTS

| | | | | |
|---|---|---|---|---|
| 5,095,480 A | * | 3/1992 | Fenner | 370/94.1 |
| 5,414,701 A | * | 5/1995 | Shtayer | 370/58.2 |
| 5,481,687 A | * | 1/1996 | Goubert | 395/421.02 |
| 5,842,224 A | * | 11/1998 | Fenner | 711/202 |
| 5,860,136 A | * | 1/1999 | Fenner | 711/201 |
| 6,034,958 A | * | 3/2000 | Wicklund | 370/395 |

FOREIGN PATENT DOCUMENTS

FR    2745454    8/1997

OTHER PUBLICATIONS

Chandranmenon, Girish P. et al, IEEE/ACM Transactions on Networking, vol. 4, No. 2, Apr. 1, 1996, pp. 141–152.

* cited by examiner

*Primary Examiner*—Ajit Patel
*Assistant Examiner*—Chirag Shah
(74) *Attorney, Agent, or Firm*—Birch, Stewart, Kolasch & Birch, LLP

(57) ABSTRACT

It is disclosed an algorithm able to compress a defined set of addresses S, the set of addresses to be compressed, belonging to the set U, the whole addressing space; for each of these addresses the algorithm must identify one and only one address belonging to C, the set of compressed address (i.e. perform a transformation S→C). The algorithm may be implemented using some low-cost random access memories (RAM) and some control logic. A performance comparison shows that is possible to perform the address compression using one order of magnitude less memory respect to the state-of-the-art techniques.

Basically, the method of the invention combines the splitting of the incoming address space (U) into a plurality of sub-spaces, a tree search algorithm for clustering a defined set (S) of identifiers contained in the sub-spaces into which the incoming addresses space (U) has been split and a sequential search performed within the right cluster in order to identify the compressed address belonging to space C.

The patent covers the algorithm, a preferred embodiment and some extended embodiments, that give extra gain.

Thanks to the invention is thus possible to implement silicon devices able to compress one order of magnitude more managed channels with respect to the state-of-the-art techniques, without area changes.

Conversely, it is possible to implement the address compression function with one order magnitude less memory resources with respect to the state-of-the-art techniques.

12 Claims, 17 Drawing Sheets

METHOD OF ADDRESS COMPRESSION FOR CELL-BASED AND PACKET-BASED PROTOCOLS AND HARDWARE IMPLEMENTATIONS THEREOF

1 BACKGROUND OF THE INVENTION

1.1 Address Compression Problem Definition

Notably, for each Communication Protocol, an Incoming Address Space (the maximum number of channels a specific protocol can handle) is defined. In this document reference is made to the so-called addressing space of $2^N$ bits as the set of Incoming Addresses.

On the other hand, a telecom equipment is able to deal only with some managed channels. The number of simultaneously manageable channels is finite and is a typical design target. Each managed channel must be addressable by means of an internal identifier, that is a subset of the Incoming Address. In this document reference is made to the space of $2^{Ncpr}$ bits of the internal identifiers as the set of Compressed Addresses.

In a telecom equipment, a function mapping some points belonging to the universe of Incoming addresses ($2^N$ bits) to a set of Compressed Identifiers ($2^{Ncpr}$ bits) should be implemented. This function is called the Address Compression Function.

Due to network management reasons, the Incoming Address Space is very large. On the other hand, the number of channels that must be managed simultaneously nowadays by telecommunication apparatuses is also very large. Moreover, data link speed is increasing at an impressive pace: in ten years from 64 Kbit/s to 155 Mbit/s and now to 1.2 Gbit/s.

Because of this, the efficiency of the design of the Address Compression Function is today a key factor in equipment like routers and switches. Altogether, designing has become critical because, due to the increased data speed, the time that can be spared to perform the Address Compression Function is reduced. On the other hand, the increasing number of manageable channels augments costs because of the increasing number of resources needed to perform the Address Compression Function.

1.1.1 Address Compression Problem Definition

Figure 1:
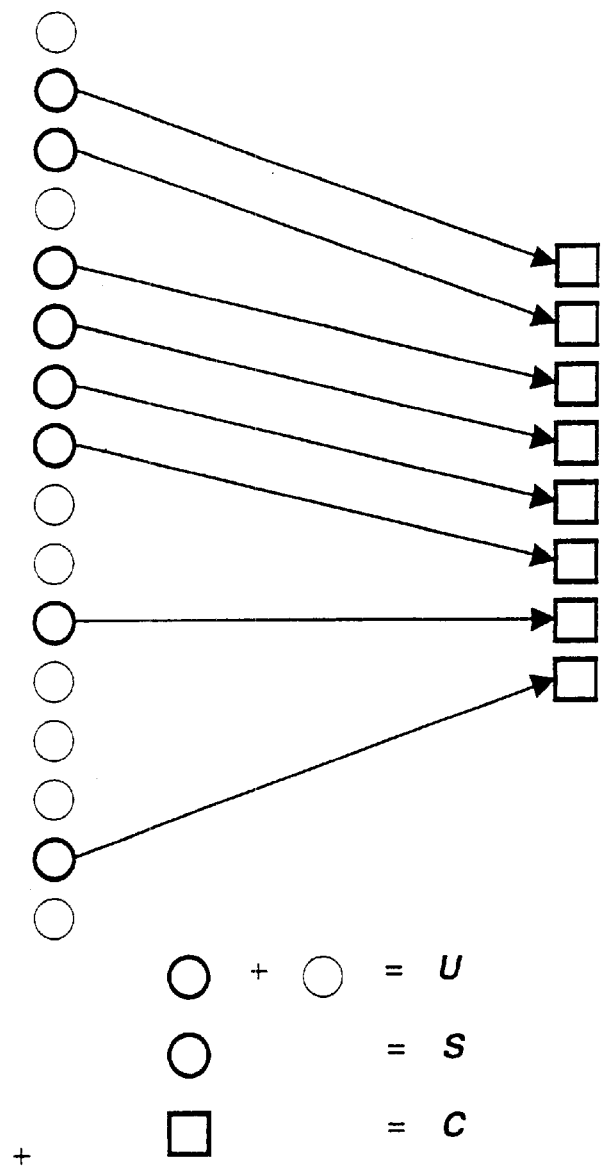

The aim of the algorithm is to compress a defined set of addresses S, the set of addresses to be compressed, belonging to the set U, the whole addressing space, as shown in FIG. 1. For each of these addresses the algorithm must identify one and only one address belonging to C, the set of compressed address (i.e. perform a transformation S→C).

n dimension of the whole addressing space ($U=\{a_0, \ldots, a_{2_n}\}$)

$n_{cpr}$ dimension of the space of compressed addresses ($C=\{a_0, \ldots, a_{2_{ncpr}}\}$)

where: $n_{cpr}<n$, $C \subset U$.

The cardinality of S must equals the cardinality of C.

1.1.2 Address Compression Function and IP Application

The most fundamental operation in any IP routing product is the Routing Table search process.

A packet is received with a specific Destination Address (DA), identified by a unique 32-bit field in current IP Version 4 implementations. The router must search a forwarding table using the IP Destination Address as its key and determine which entry in the table represents the best route for the packet to take in its journey across the network to its destination.

A <<flat>> forwarding table would have a size of $2^{32}$ addresses, that means 4 Gbytes of address space (16 Gbytes of data). The DA must be compressed to point to a reasonable table size.

The route search operation is the single most time-consuming operation that must be performed in routers today, and typically defines the upper bound, on the router's ability to forward packets.

The problem has grown even more challenging in recent years.

Data links now operate routinely at 100 MBits/second, and generate nearly 150,000 packets-per-second requiring routing.

New protocols, such as RSVP, require route selection based not only on Destination Address, but potentially also Protocol Number, Source Address, Destination Port and Source Port.

IP Version 6 will increase the size of the address field from 32 bits to 128 bits, with network prefixes up to 64 bits in length. Expanded use of IP Multicasting requires that searches include large numbers of Class D (Multicast Group) addresses with large numbers of users.

Moreover, the ever-expanding number of networks and hosts on Internet is making routing table sizes larger and larger.

1.1.3 Address Compression Function and ATM Applications

ATM data equipment, to be compliant with ITU and ATM-forum specifications, must be able to receive ATM cells for any admissible value of the header fields VPI.VCI. The total length of these fields is 24 bits (16.7 millions of admissible values).

On the other hand, the ATM equipment is designed to manage a number of internal channels (at least) equal to the maximum number of engageable channels. This number depends on the application: from one to hundreds in the case of terminals; some thousands (4K, 64K) in case of core network equipment.

In the following description, the univocal (shorter) internal channel identifier, will be referred to as Channel Identifier (CID).

It is evident the requisite that the processing be able to map from any possible value of VPI.VCI (24 bits) to any possible CID (e.g. 12 bits).

1.2 Algorithm Classes

A compression function able to map from a string of length N bits to a (unique) string of length Ncpr (Ncpr<N) can be implemented in various ways.

Two main classes exist: the algorithms with an unpredictable duration belong to a first class; the others, with a predictable duration, belong to the second one.

For those belonging to the first class, it is not possible to know for how much time (microprocessor instructions or clock cycles) the algorithm will run before hitting the compressed identifier. It will depend on the number of active connections. These algorithms are normally easier to implement, do not require lots of resources and can be sped-up only by improving RAM access time of the memories where the search tables are located.

For the algorithms of the second class, (predictable duration algorithms) it is possible to know, UNDER ANY CONDITION, how much time (microprocessor instructions or clock cycles) the algorithm will run before hitting the compressed identifier. These algorithms often require a lot of resources.

An algorithm belonging to the second class ensures that the maximum search time is less than the time used to receive the shortest packet[1], this guarantees the maximum allowable throughput of the equipment.

[1] 64 bytes for IP, 53 bytes for ATM 1.2.1 Unpredictable Duration Algorithms

IP routers companies have developed the algorithms belonging to this class some years ago. It is possible to call them <<classical route search techniques>>. The main algorithms will be explained for an IP context to provide the reader with useful historical background.

1.2.1.1 The Patricia Tree

This is the most popular algorithm used in router "slow paths". The forwarding table, (associating each prefix entry with an exit port and next-hop MAC address) is stored in a "Binary Root Tree" form.

The table is organized in a series of "nodes", each of which contains a route of different length, and each of which has two "branches" to subsequent nodes in the tree. At the ends of the branches there are "leaves", which either represent full 32-bit host routes (for devices attached directly to the router) or most-specific routes available to a particular subnet.

The algorithm is able to map ANY incoming vector to a unique outcoming identifier. Unfortunately, in the worst case, the algorithm will have to travel all the way to the end of the tree to find a leaf, and the time needed cannot be absolutely predictable.

The Patricia Tree approach does not scale well to level-2 packet switching: a worst-case lookup involves a large number of memory accesses, taking far more time than that available at gigabit rates. Moreover, hardware implementation is rather complex. This algorithm was developed for general-purpose software implementations.

1.2.1.2 Hashing Tables

"Hashing" is an alternative approach. Unlike the Patricia Tree, hashing operates strictly on an exact-match basis, and assumes that the number of <<channels>> (IP Destination Addresses, VPI/VCIout) the system must handle at any one time be limited to a few thousands.

A "hash" function—a sort of compression algorithm—is used to condense each incoming identifier (24 or 32 bits) in the table to a smaller-sized entry (8–10 bits typically).

When a packet is received, an equivalent "hash value" is computed quickly from its incoming identifier. This value points to a hash table (named a "slot") that corresponds to one or more outcoming identifiers. The compression effected by a hashing function makes the table small enough to be quickly searched sequentially using simple hardware-based exact matching techniques.

The main problem involved in the hashing technique is that it assumes a <<flat>> distribution of the values of incoming identifiers. The <<hash>> function maps the space of possible values of incoming identifier in a plurality of sub-spaces.

Figure 2:
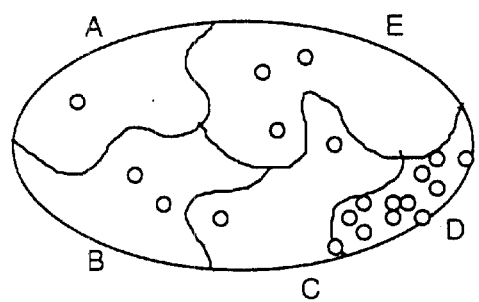
Figure 3:
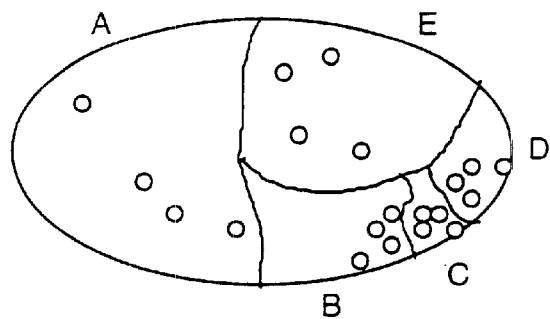

In FIG. 2, the ellipse indicates the U space and the incoming valid identifiers, that is the S space, are indicated as tiny circles. The <<hash>> function generates the boundaries between sub-spaces. If, as depicted in FIG. 3, in a sub-space a number of identifiers greater than the slot size (hash table) must be mapped, it is necessary to recalculate anew the hash function in an appropriate way.

This involves item sorting in hash tables that cannot be performed in a real time mode.

This process is easy to implement in hardware and tends to perform fairly well, albeit in a probabilistic manner.

Unfortunately there are a number of drawbacks with this algorithm. In a hardware implementation it is not possible to change <<on the fly>> the <<hash>> function, because a full item sorting is implied. This means that the only way to overcome the problem is to increase the slot length, but obviously this is not always possible.

Figure 4:
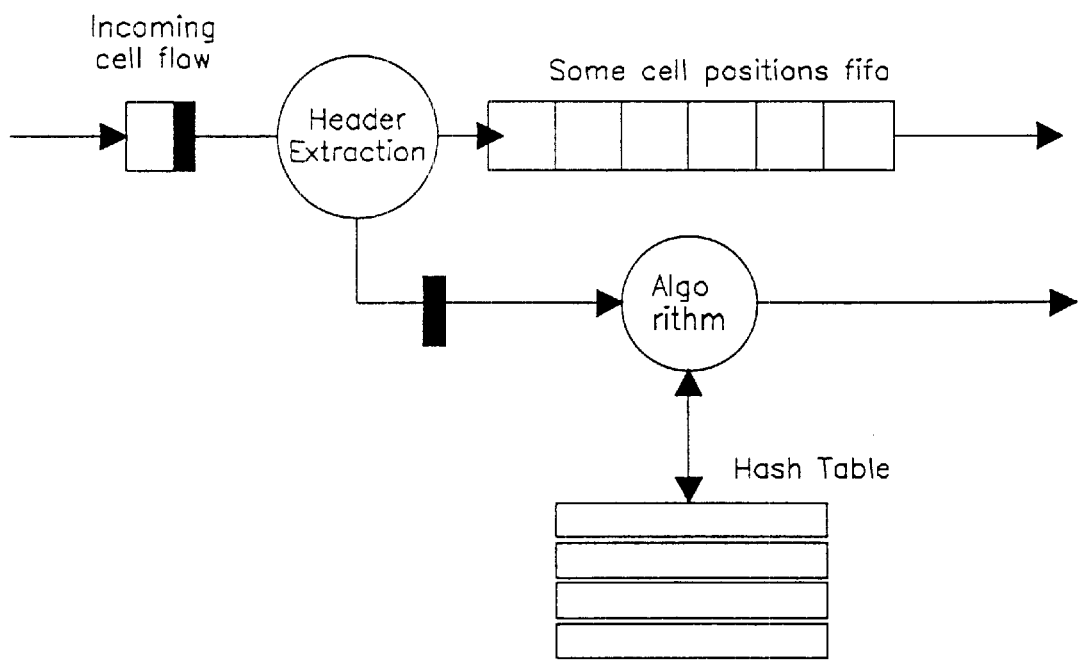

The main ATM IC developers (Motorola, IDT, Transwitch) have implemented an algorithm of this kind. A typical architecture is shown in FIG. 4

A main problem is that the incoming identifier processing time is not deterministic (in some case a sequential search is needed) and eventually will become longer than one packet (cell) time.

The ACF function is implemented by means of several readings in the Hash tables that are written by the controlling microprocessor in a "off-line" manner.

The algorithm implies the subtle assumption that the sequence of incoming identifiers be <<spread>> on the entire set of sub-spaces and that in any sub-space the average search time be shorter than the packet (cell) time.

Moreover, use of a quite long fifo (10, 20 packets/cell positions) is required in order to decouple the incoming rate speed from the speed of the compression algorithm, that in the average would be the same.

In some cases, it may happen that the packet (cell) is lost or misrouted. The only way to cure this problem is to increase the speed of the hash table[2].

[2] For example, the Motorola ATMC devices needs 10 nS hash memories.

This architecture is preferred by NIC chip providers because is cheaper, but it is unable to support the mapping of any possible incoming identifier to local identifiers.

In the present context sometimes use is made of different expression for indicating materially the same thing. In particular the same N-bit string or the same Ncpr-bit string is often referred to with the expressions: physical layer identifier, virtual path identifier address, vector. These are expression that are commonly used and perfectly understand by technicians and the different expressions are often used when describing an algorithm or a data processing structure, and so forth.

1.2.2 Predictable Duration Algorithms

Figure 5:
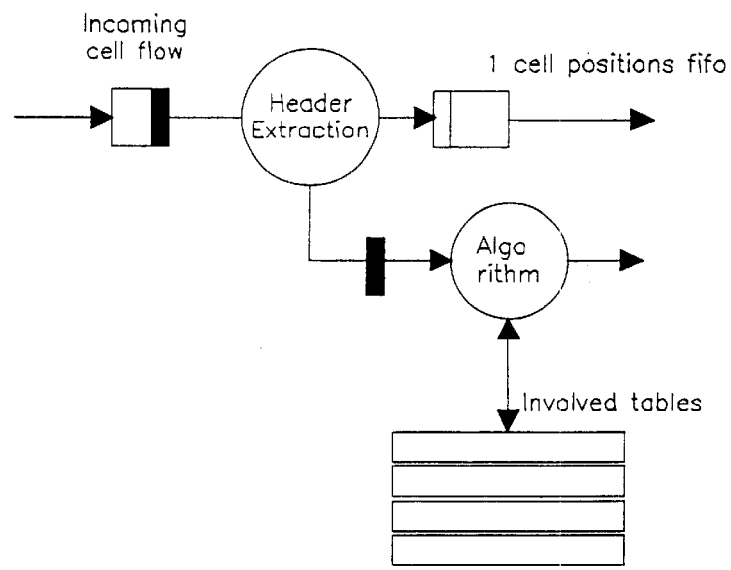

In predictable duration algorithms, the ACF is performed under any condition in a time that may be less than or even equal to the packet time (cell period). A typical architecture is shown in FIG. 5.

Because the algorithm duration may be knowingly shorter than a packet (cell) cycle, it is possible to admit ANY type of incoming traffic. On the other hand, more chip or system resources are needed to implement the function than those do that would be required by an algorithm of unpredictable duration.

There are three well-known techniques that are able to perform ACF predictably in less than one packet (cell):

CAM

Sequential search

Binary tree 1.2.2.1 CAM

According to this approach, the incoming address (e.g. VPI.VCI) is input to a Context Access Memory. The CAM hits the correct compressed. If there is no hit the cell is discarded.

The CAM is wide as the incoming address and is deep enough to accommodate the maximum number of connections.

The time of execution of the ACF is typically of few clock cycles. It is in any case less then a cell time. The main problem of this architecture is the availability of the CAM module[3].

[3] On the market, there is a component that implements CCF function in this manner. It is the Fujitsu MB86689 Address Translation Controller (ATC)

1.2.2.2 Sequential Search

Figure 6:
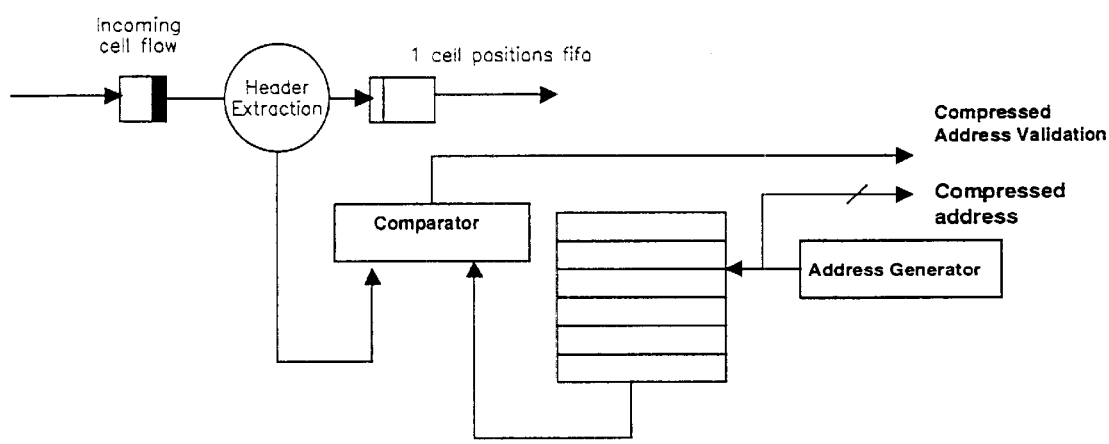

To obtain a compressed identifier from an incoming address, it is possible to perform a sequential search on a RAM, for a number of cycles less or equal the packet (cell) time. A relatively small RAM, a counter to generate addresses and a unique 24-bit comparator is all is needed, as depicted in FIG. 6.

1.2.2.3 Extended Sequential Search

Figure 7:
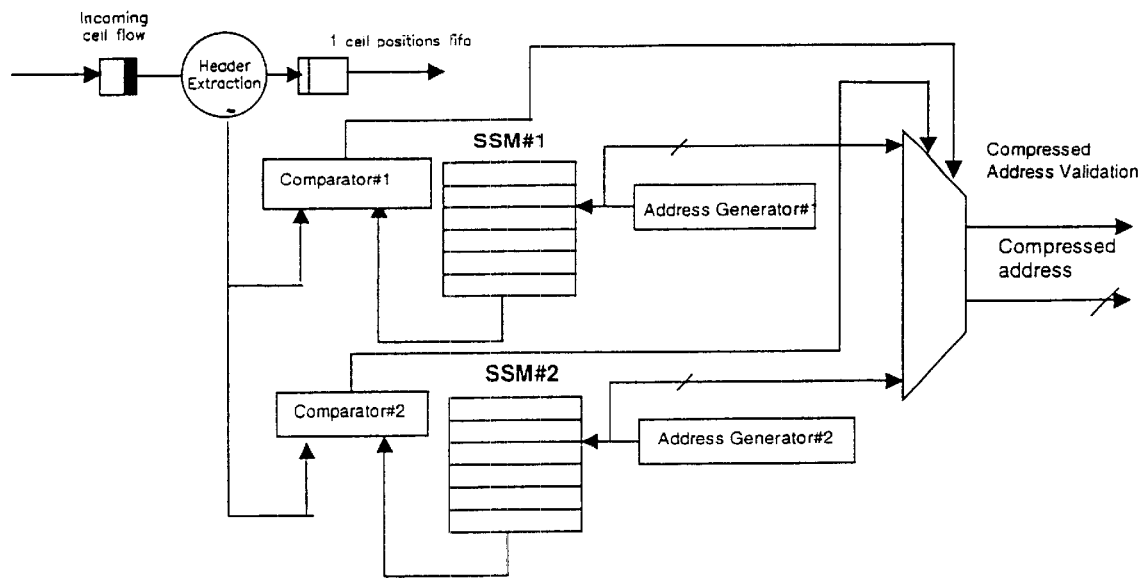

To increase the extent of the sequential search without exceeding the number of available clock cycles, it is possible to use several RAMs, several counters to generate the addresses, several 24-bit comparators and a priority encoder, as depicted in FIG. 7.

1.2.2.4 Binary Tree

The mapping from the valid incoming vectors to the compressed identifier is implemented by means of a chain of memories.

A pointer chain link has to be written in these memories in order to link any valid incoming vector with the right compressed identifier The first memory is addressed by a bit slice of the incoming address (typically the most significant bits). The content is a pointer to the second one.

The second memory is addressed by the pointer obtained from the first one, chained with a new slice belonging to the incoming vector. The content is a pointer to the third one.

The third memory is addressed by the pointer obtained from the second one, chained with another slice belonging to the incoming vector. The chain ends when any bit belonging to the incoming address has been used.

In order to ensure a no-blocking probability, the wide of any memory has to be equal to Ncpr.

Unfortunately, because of this, the memory utilization is really poor (around 5,10%).

Figure 8:
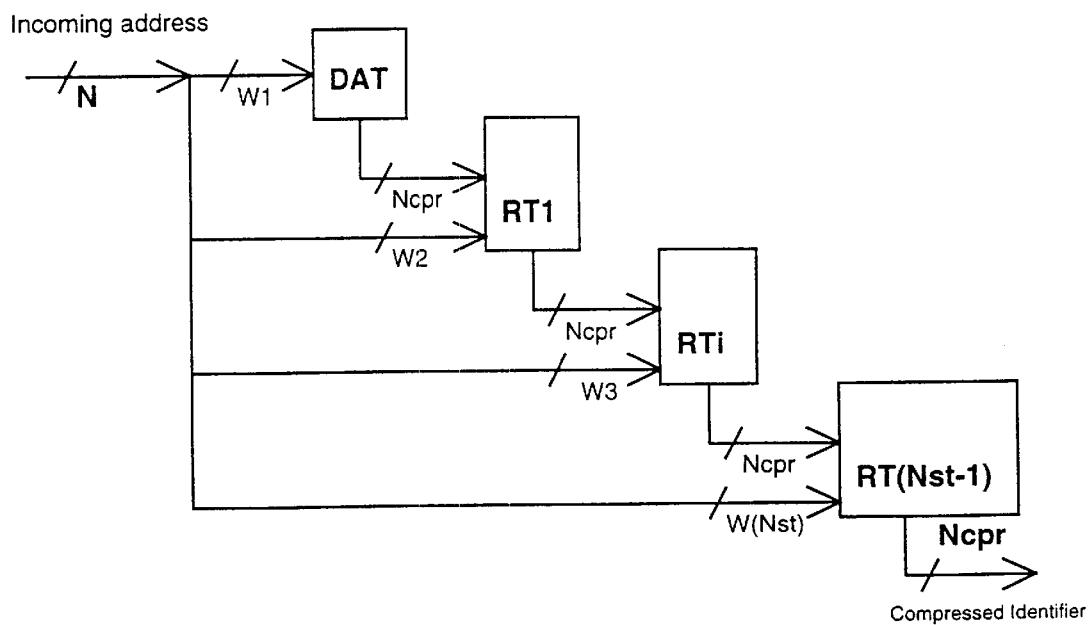

FIG. 8 shows the organization of the memories needed for implementing a Binary Tree Search.

Figure 9:
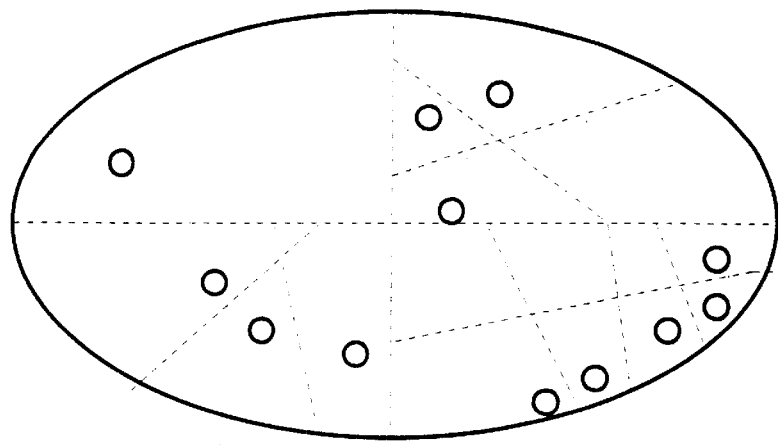

In FIG. 9 the ellipse depicts the U space and the set of incoming valid identifiers, the S space is indicated by the tiny circles. The Binary Tree technique splits the U space in areas of equivalent size, by means of a direct addressing table or DAT; then the sub-spaces are split again, by means of RTis, in order to ensure that no more than a point belonging to S is present in a particular sub-space.

Figure 10:
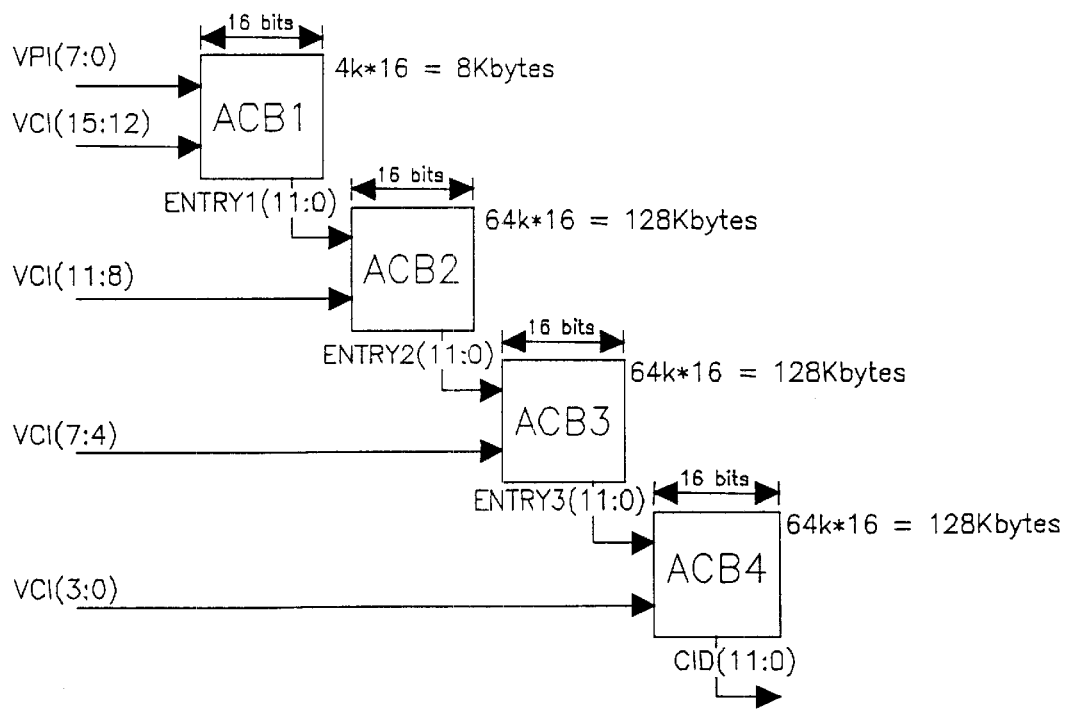

FIG. 10 shows a typical implementation related to ATM words of 24 bits of incoming VPI.VCI that must be converted to proper channel identifiers CID, 12 bits wide. The basic assumption is to implement a research path on some external RAM bank, addressed by means of VPI.VCI fields.

Four banks (ATM Compression Blocks) of RAM are addressed for a total amount of 392 Kbytes, in order to have up to 4096 different CIDs. Four addressing cycles are needed. The dimensions of the memories depend on the maximum number of CDs needed.

U.S. Pat. No. 5,414,701 describes a method and a structure for performing address compression in an ATM system according to a so-called content addressable memory (CAM) as described above.

Standing the requisite of performing the required mapping of incoming N-bit identifiers into Ncpr-bit virtual path identifiers within a cell time slot, the implementation of a consequent data processing structure for performing such an address compression function, following one of the known approaches as the ones reviewed above, implies the use of a relatively large amounts of physical resources in terms of RAM memories.

Irrespectively, of the approach followed, the RAM requisite for a reliable operation of the data processing structure employed for performing address compression represents a crucial cost factor and it is evident the opportunity of finding methods of performing the address compression more efficient than the presently known ones and that may be realized at a reduced cost.

2 OBJECT AND SUMMARY OF THE INVENTION

It has now been found a method of address compression outstandingly more efficient than the known methods, capable of reducing the RAM requisite for comparable performances in terms of number of clock cycles necessary to complete the compression algorithm.

Moreover, when assuming an optimization of the data processing structure of the invention, the performance in terms of the two parameters of memory requisite and of number of clock cycles required, is significantly better than the performance obtainable from any of the systems realized according to the known approaches.

These important advantages are achieved, according to the present invention, by a method that combines certain aspects of an unpredictable duration algorithm with those of a classical sequential search algorithm. The synergistic combination of different approaches produces the reported outstanding performance.

Basically, the method of the invention combines the splitting of the incoming address space (U) into a plurality of sub-spaces, a tree search algorithm for clustering a defined set (S) of identifiers contained in the sub-spaces into which the incoming addresses space (U) has been split.

Having so clustered the elements of the defined set (S) of identifiers, a sequential search is performed within each cluster so constructed for identifying the Ncpr-bit identifier belonging to the compressed address space (C).

By performing the sequential search so restricted over a pre-identified cluster of a known size, ensures identification within a given number of clock cycles (a predictable time span). The system may be further optimized for either reducing the number of clock cycles required by the sequential search or for reducing the memory requisite.

The method of the invention is more precisely defined, respectively, in the independent claims 1 and 6 for a unclassified address space and preferred embodiments are defined in claims 2 and 5, while the data processing structure of the invention that implements the method is defined in the appended claims 7 and 12 for a classified address space, and preferred embodiments in claims 8 to 11.

3 BRIEF DESCRIPTION OF THE DRAWINGS

FIG. 1—Representation of address compression problem

FIG. 2—Example of "hit" distribution

FIG. 3—Recompilation of "hash" function

FIG. 4—Typical unpredictable duration class implementation

FIG. 5—Typical predictable duration class implementation

FIG. 6—Sequential Search structure

FIG. 7—Extended Sequential Search structure

FIG. 8—Binary Tree search structure

FIG. 9—U space splitting via Binary Tree technique

FIG. 10—Channel compression block data structure in ATM environment

Figure 11:
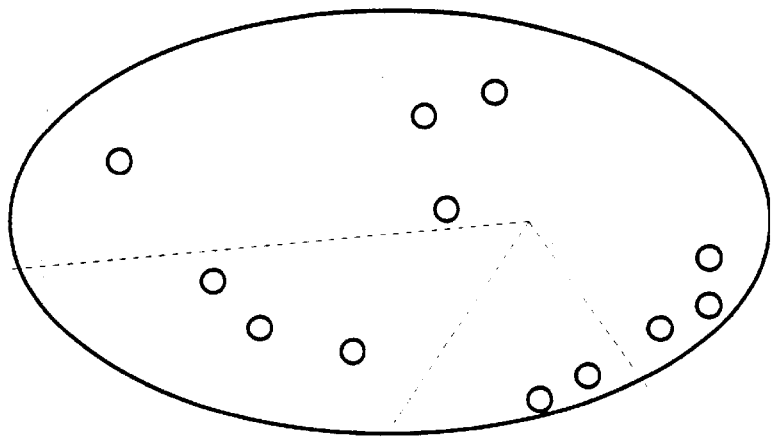

FIG. 11—U space splitting via the CSSA technique of the invention

Figure 12:
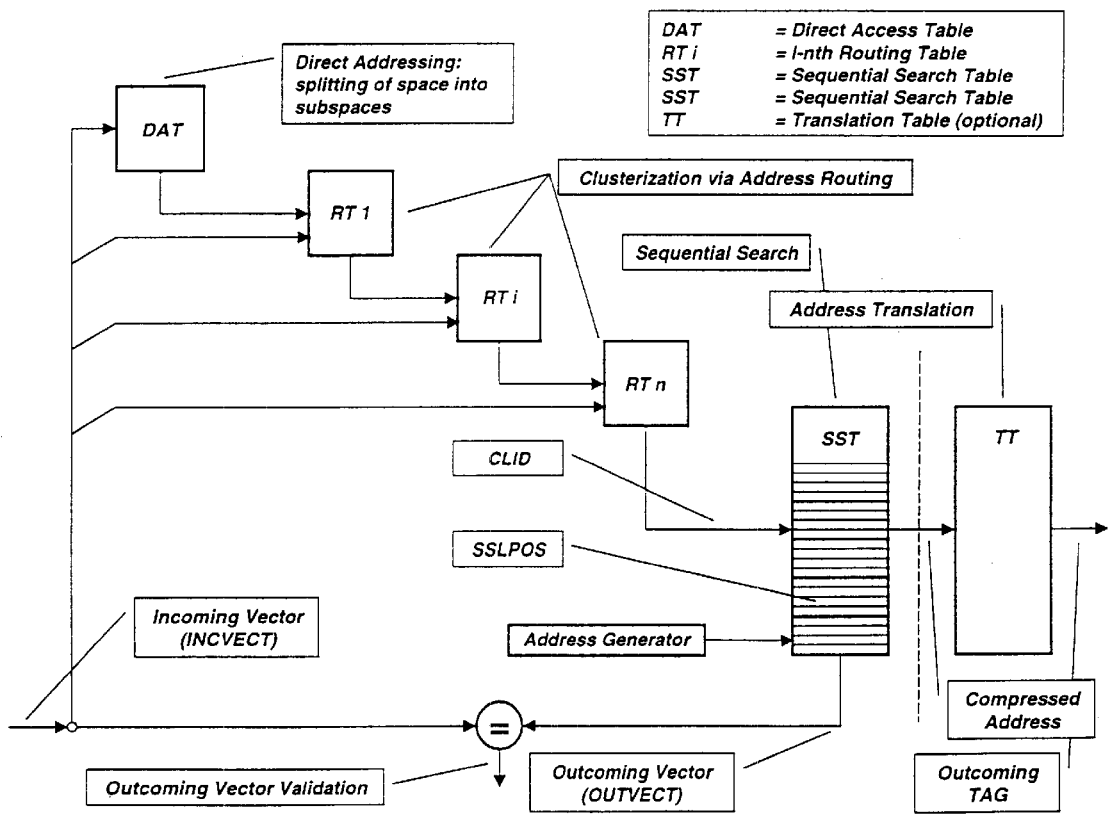

FIG. 12—Block diagram of a CSSA system of the invention

Figure 13:
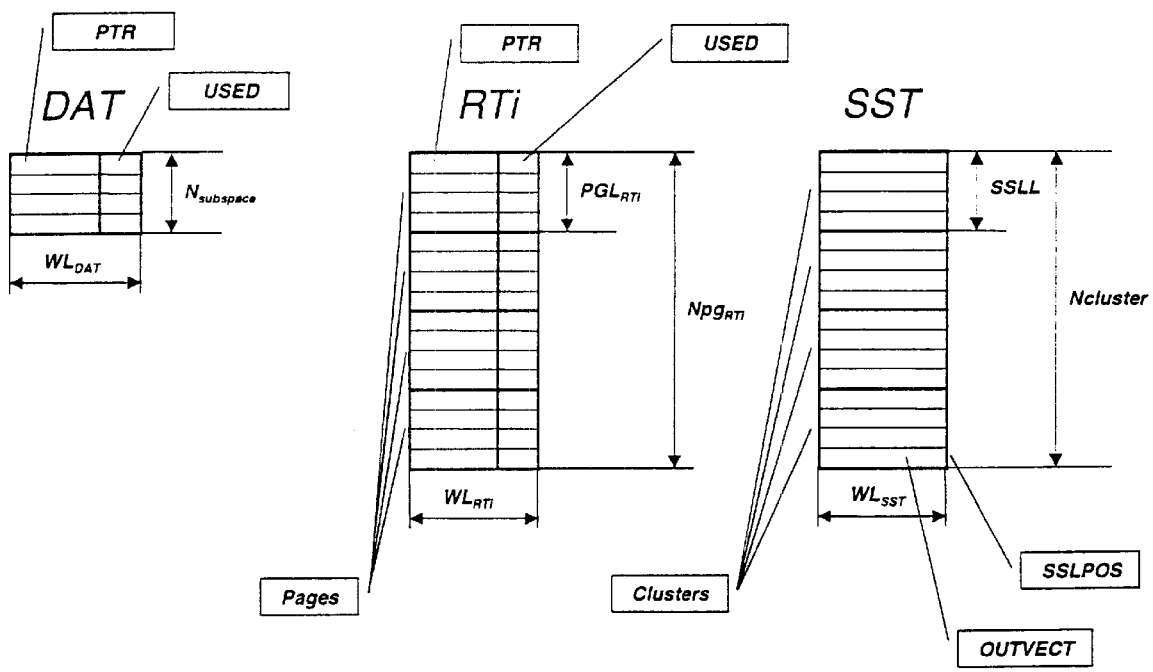

FIG. 13—Layout of DAT, RTi and SST blocks

Figure 14:
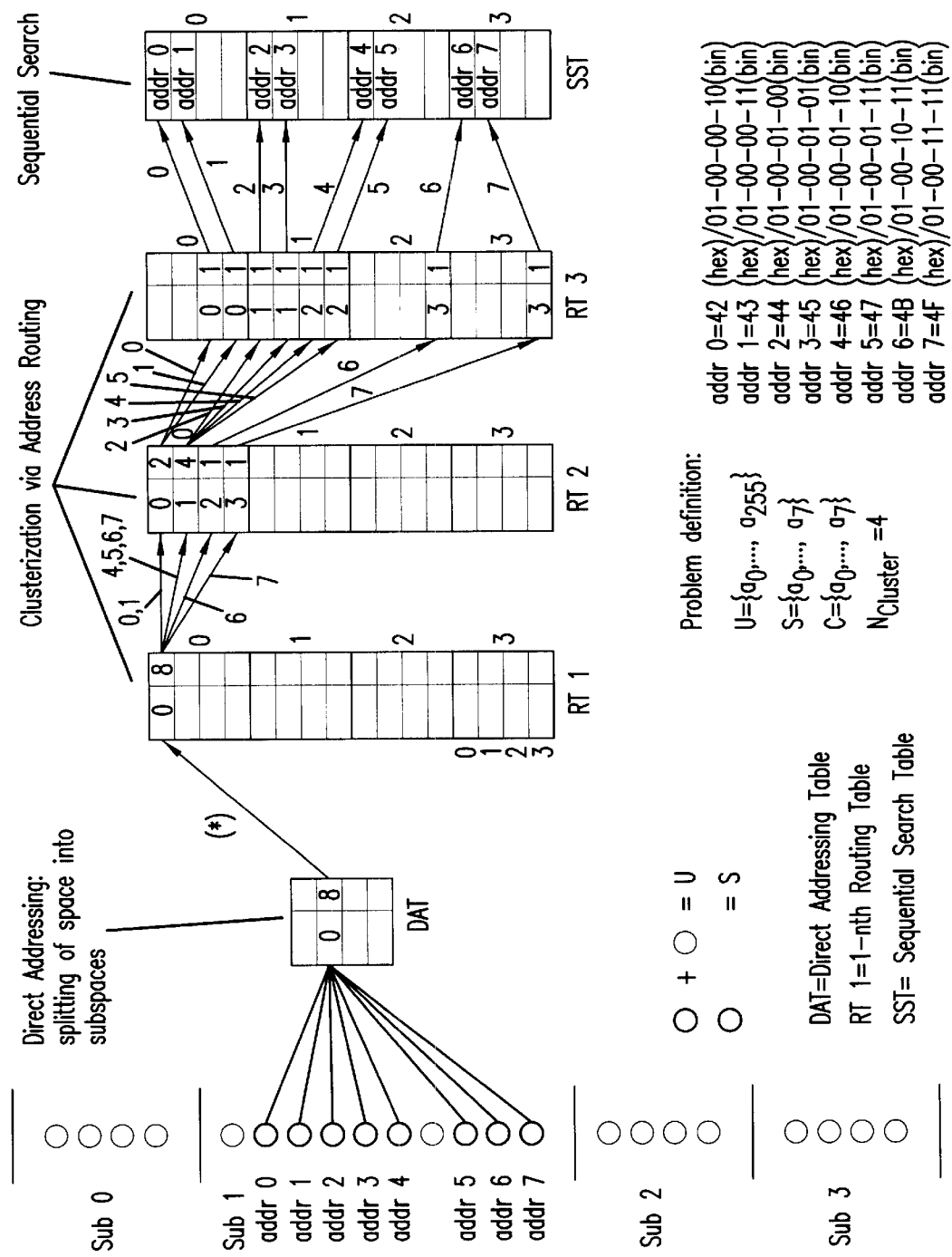

FIG. 14—Example 1 of CSSA operation

Figure 15:
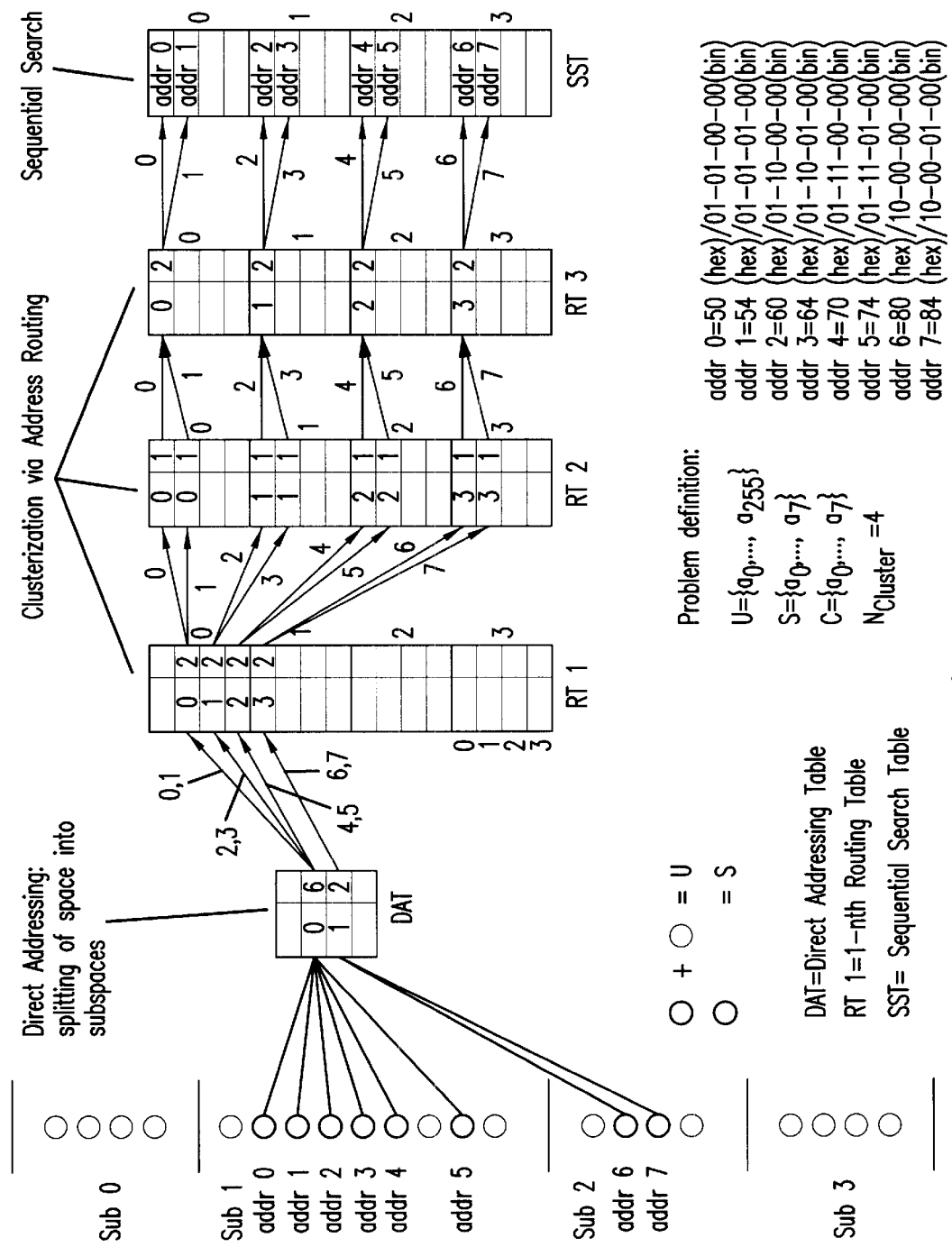

FIG. 15—Example 2 of CSSA operation

Figure 16:
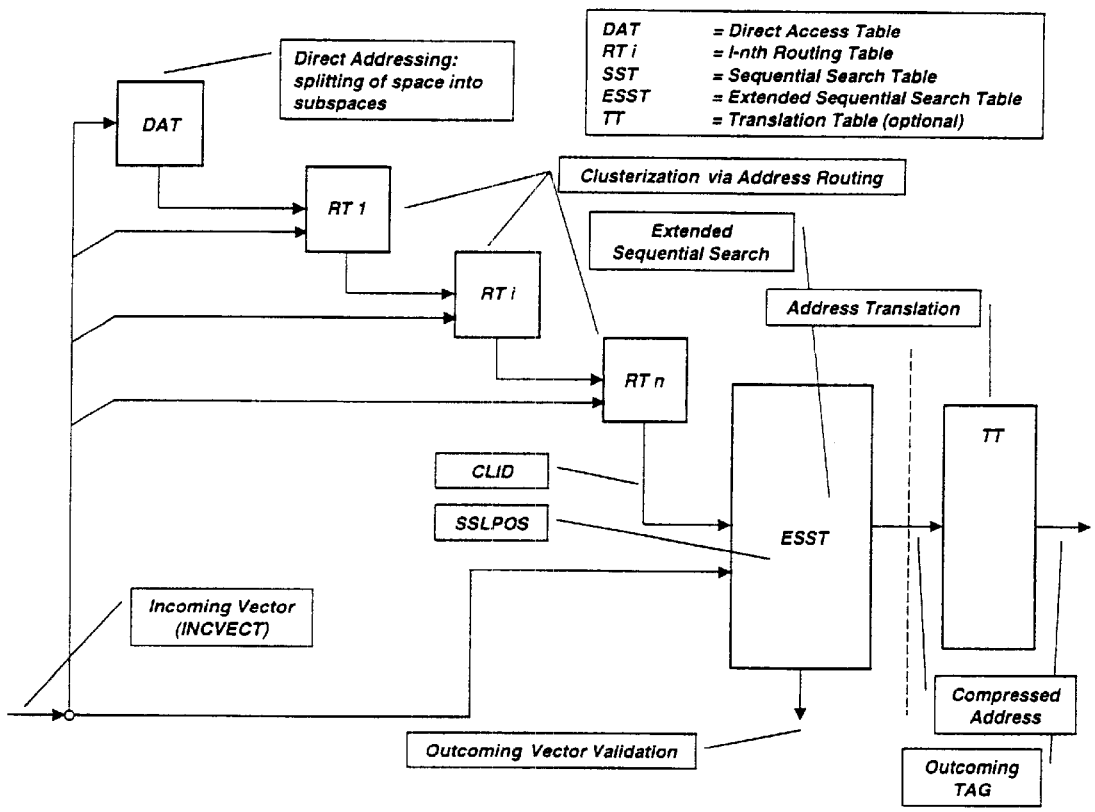

FIG. 16—Alternative embodiments of the system of the invention

Figure 17:
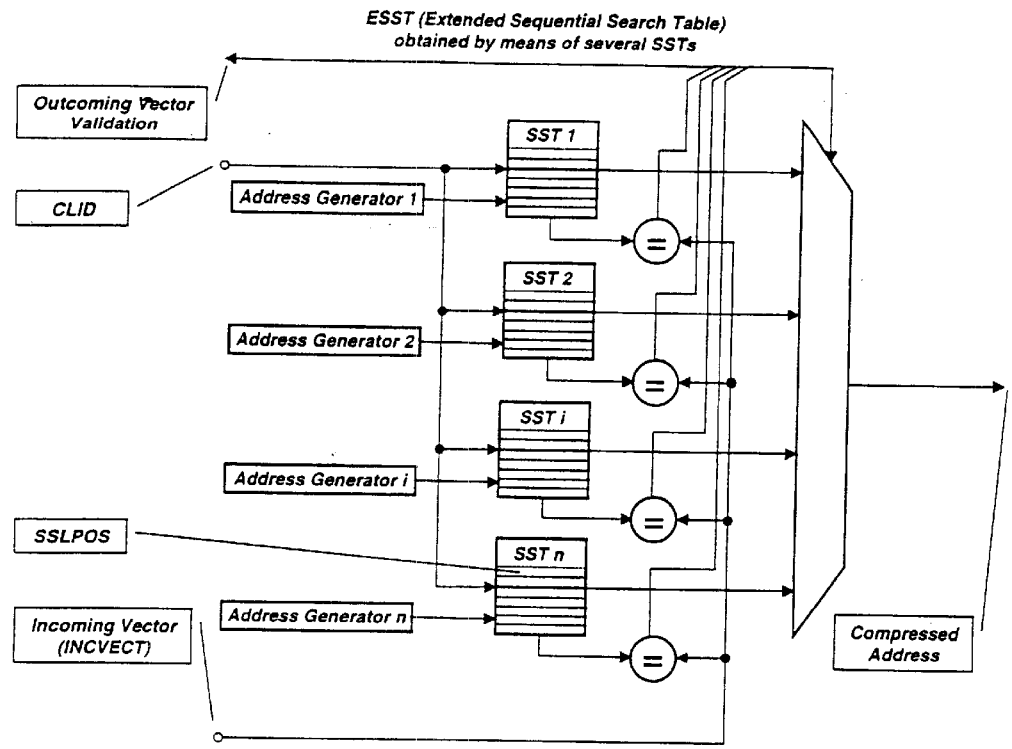

FIG. 17—Extended CSSA #1—Sequential Search Table with different SSTi

Figure 18:
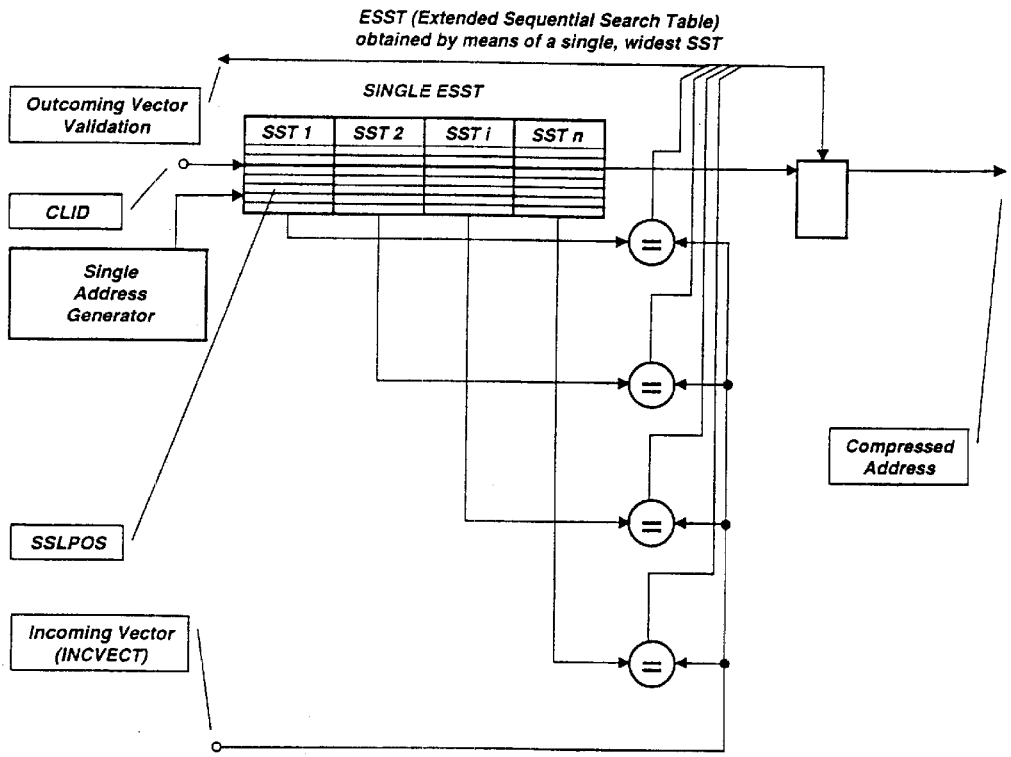

FIG. 18—Extended CSSA #2—Sequential Search Table with a single, wide SST

Figure 19:
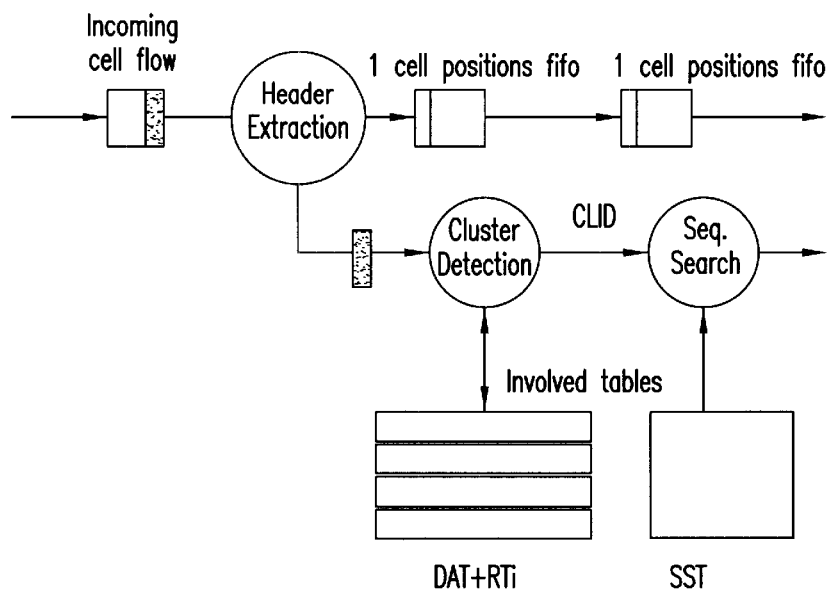

FIG. 19—Extended CSSA #3—pipelined fifos, staged architecture

Figure 20:
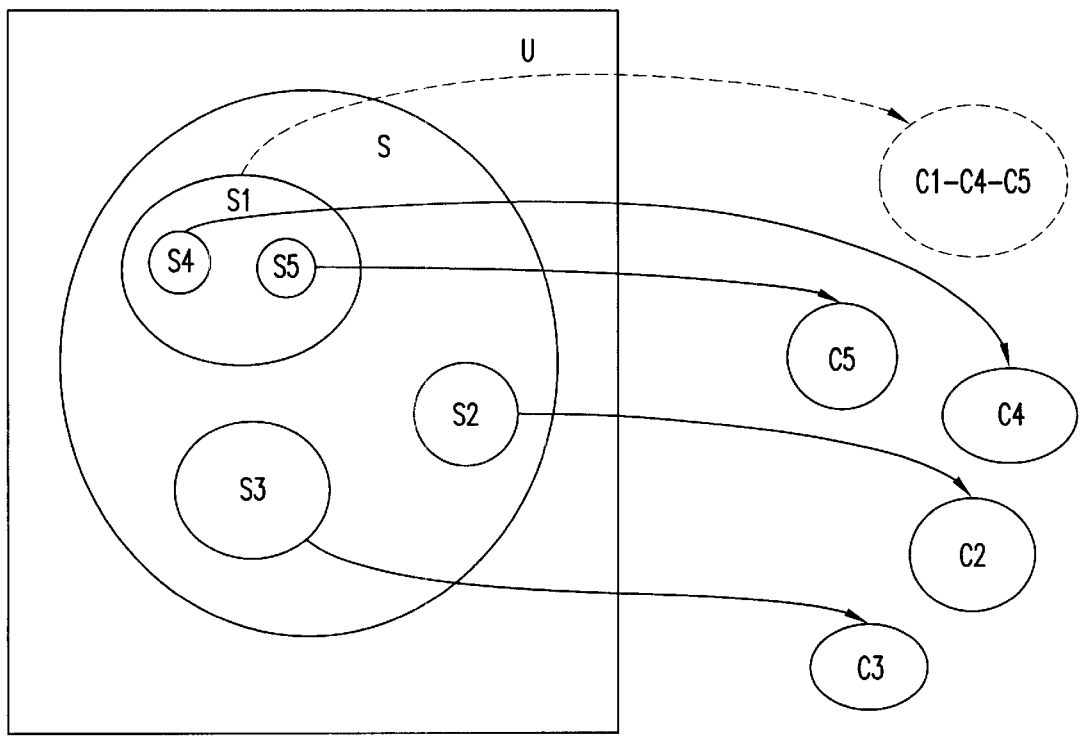

FIG. 20—Problem representation example for Extended CSSA #4

Figure 21:
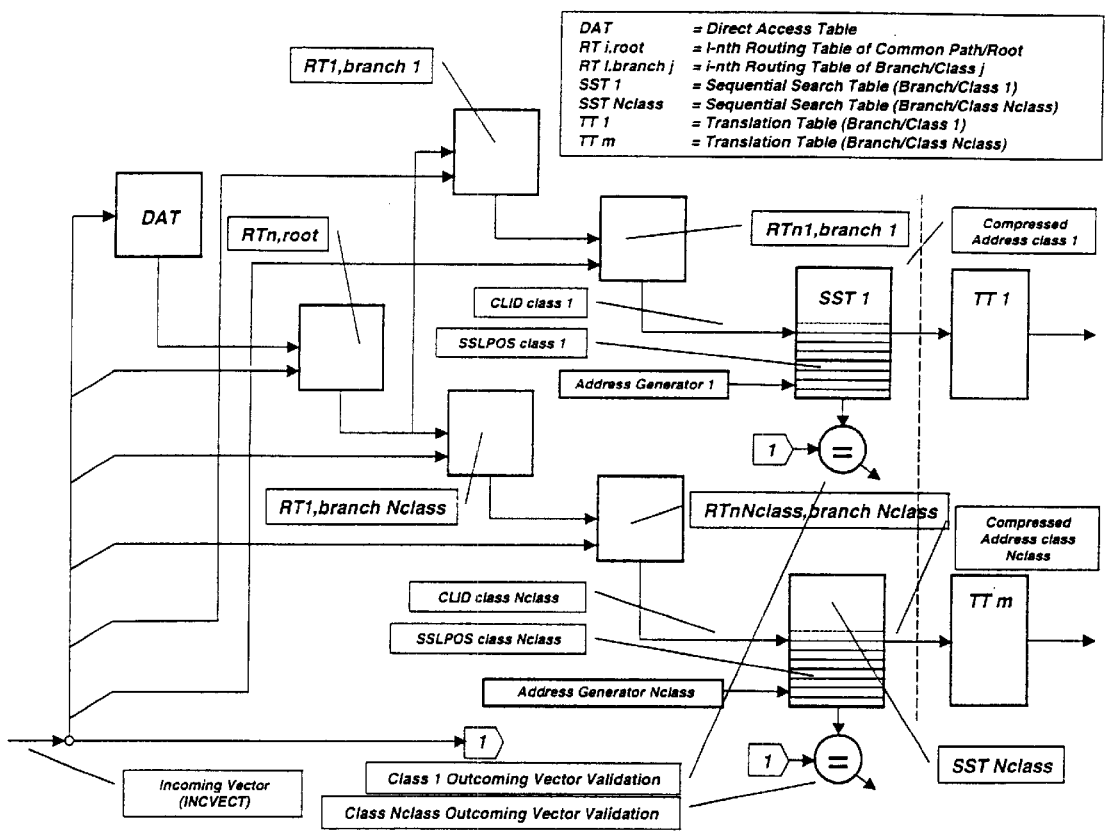

FIG. 21—Extended CSSA #4 architecture

Figure 22:
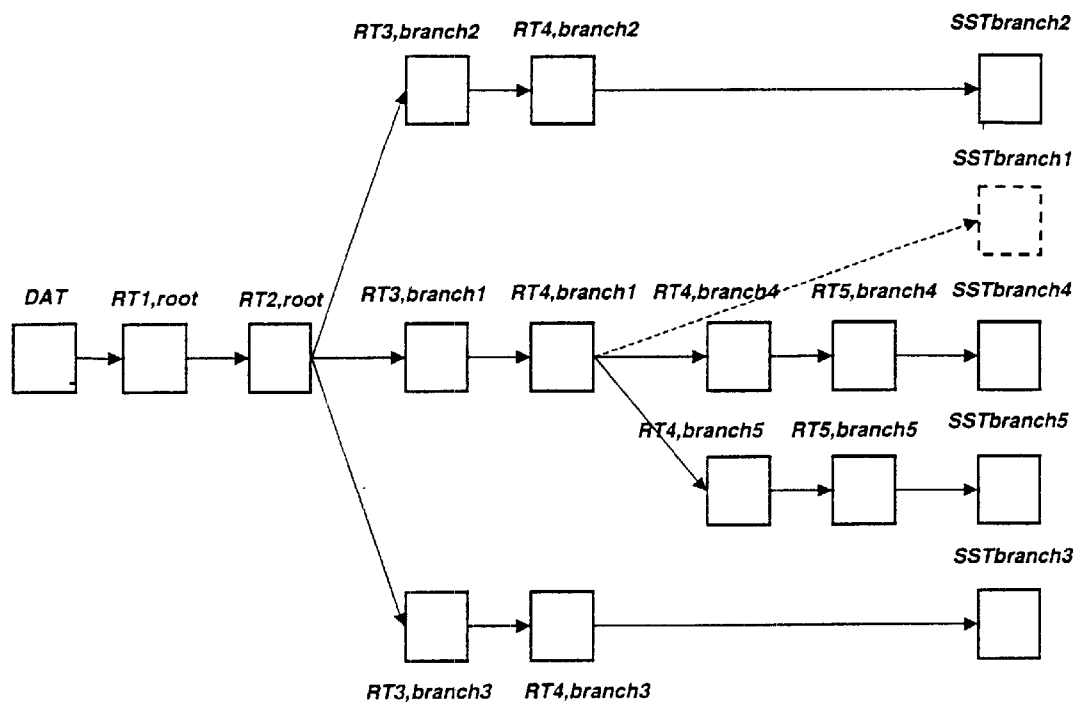

FIG. 22—Implementation example for Extended CSSA #4

Figure 23:
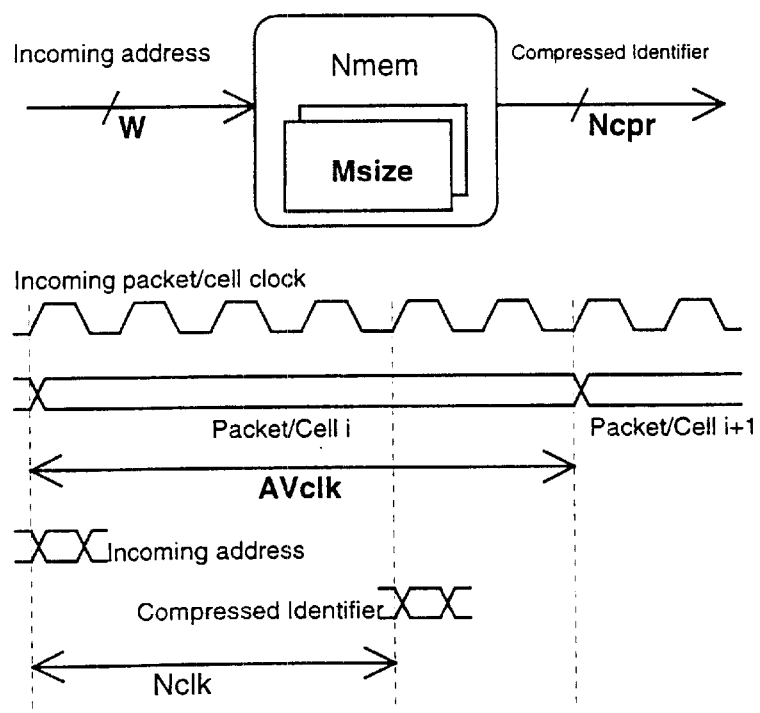

FIG. 23—Generic Address Compression Function

Figure 24:
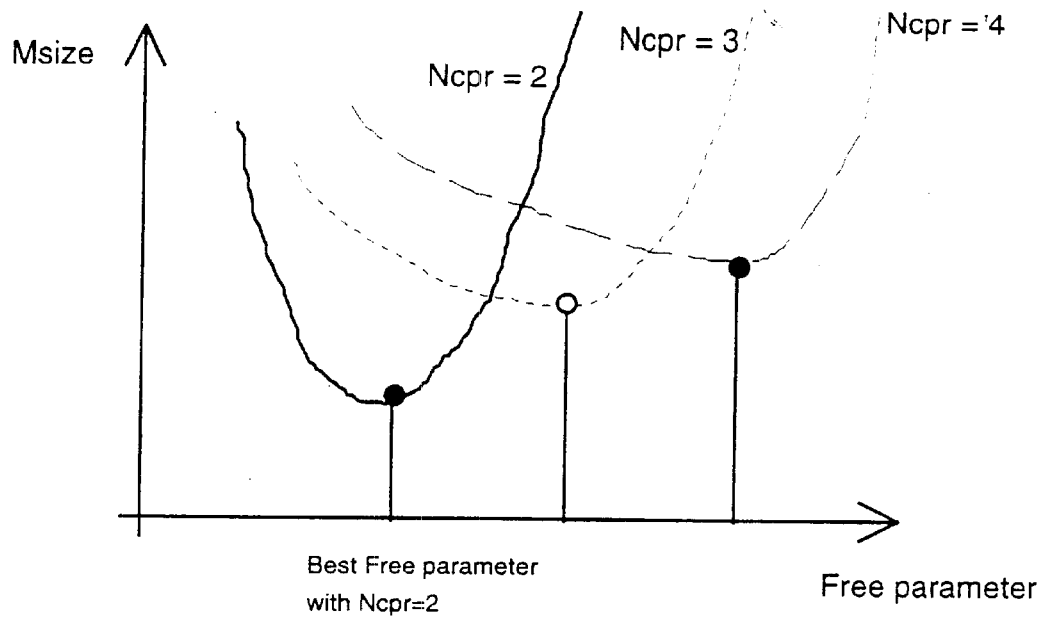

FIG. 24—Performance evaluation method

Figure 25:
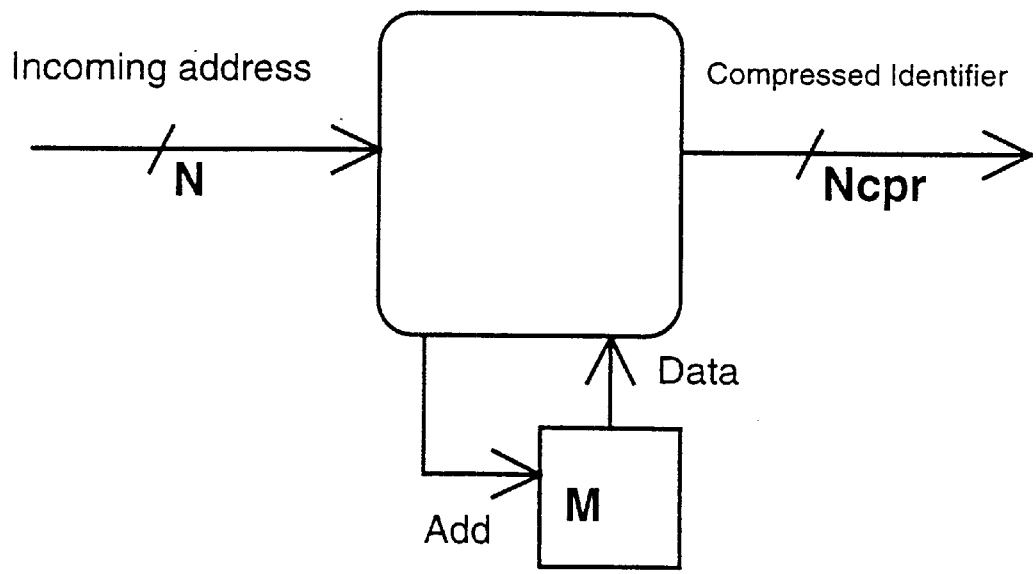

FIG. 25—Pure sequential search structure

Figure 26:
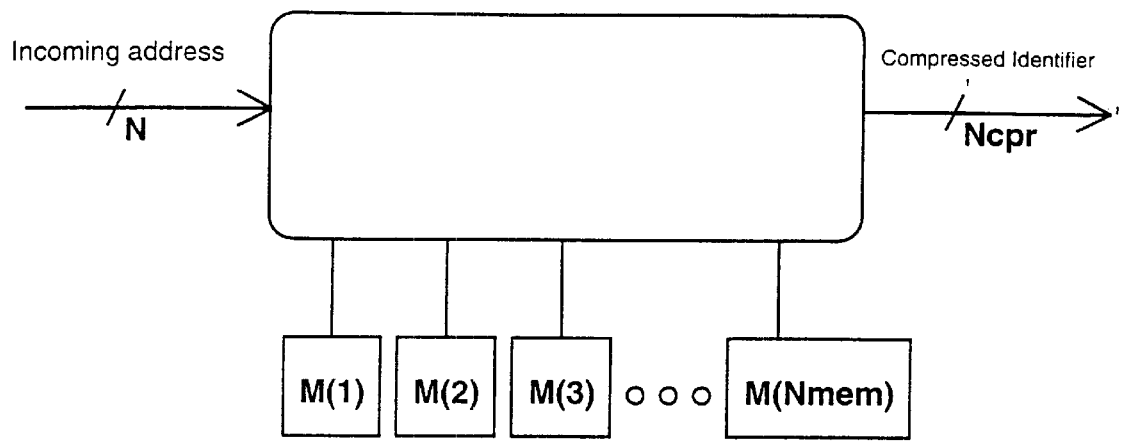

FIG. 26—Extended sequential search structure

Figure 27:
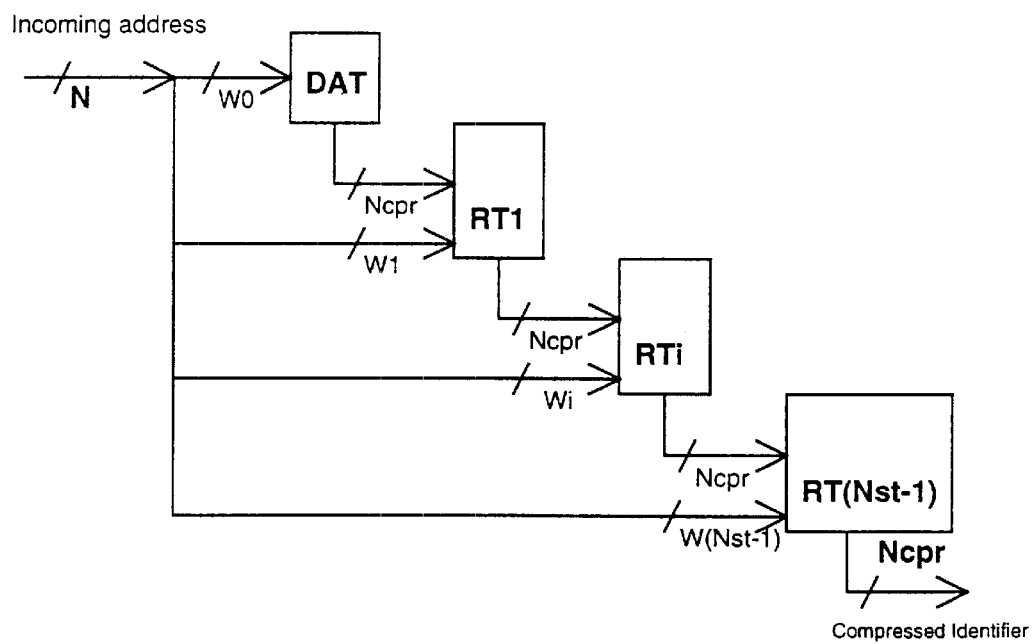

FIG. 27—Binary Tree search structure

Figure 28:
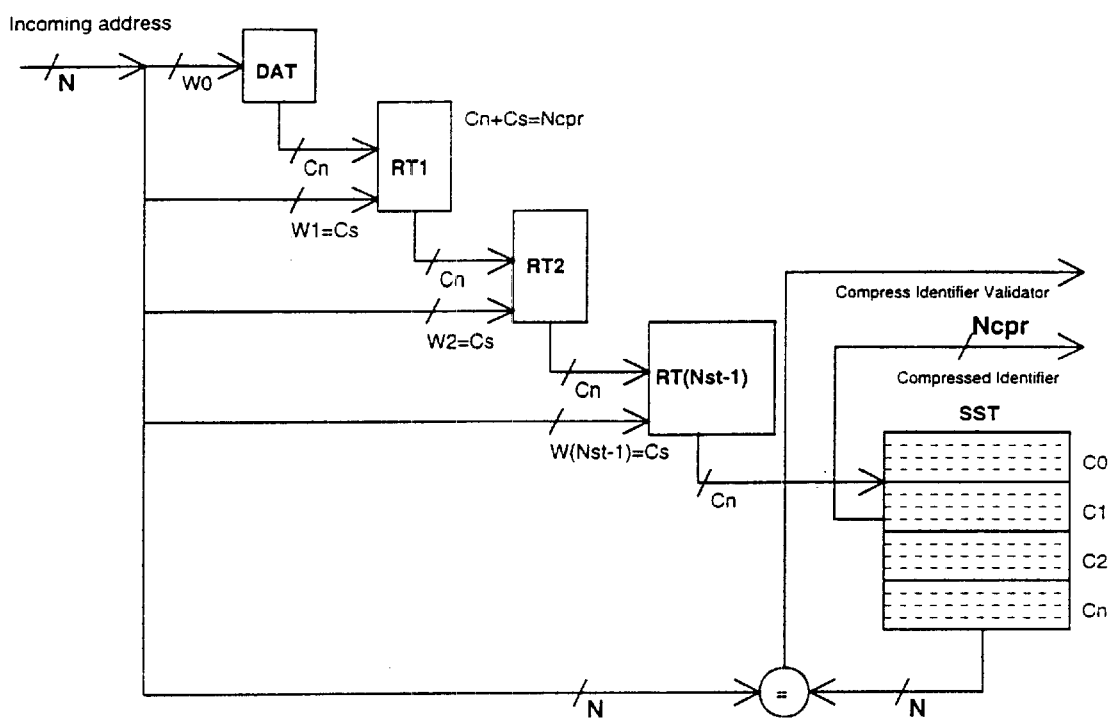

FIG. 28—Clustered Sequential search structure

DESCRIPTION OF AN EMBODIMENT OF THE INVENTION

3.1 The Clustered Sequential Search Algorithm (CSSA) of the Invention

The novel CSSA technique of the invention splits the U space in areas of equivalent size, by means of a DAT that is preferably made as small as possible; then the sub-spaces are effectively split again, by means of a cascade of Rtis, in order to ensure that no more that SSLL points belonging to S are present in a particular sub-space. In the example shown in FIG. 11 SSLL is set to 4.

To identify, in the addressed sub-spaces, the only points belonging to S, a sequential search is performed by means of a SST (sequential Search Table). The following paragraphs explain in detail the algorithm.

3.1.1 CSSA Description

The proposed algorithm combines both clustering of space and sequential search. The set S is split in clusters and within each cluster a sequential search is performed. More precisely CSSA is performed in three main steps:

1. splitting of U in equal subspaces (each subspace can contain either the whole S or some elements of S nor any element of S);
2. clustering of S (elements of S are divided among a set of clusters);
3. sequential search within each cluster;

Splitting is performed into the Direct Addressing Table (DAT), the clustering phase is performed in a cascade of Routing Tables (RTi), while the linear search is performed in the Sequential Search Table (SST). This structure is illustrated in FIG. 12.

As depicted in FIG. 12 the structure feeds an eventual translation table (TT), according to a common technique.

The listed tables have the layout shown in FIG. 13. The fields belonging to each table are described in the following boxes.

| RTi (i-nth Routing Table) | |
|---|---|
| RTi[i].PTR | pointer to a selected page of RT(i+1) (if RTi[i].PTR = k it means that page k of RT(i+1) is pointed (RT(i+1)[k])); |
| RTi[i].USED | number of times a pointer is used, if RTi[i].USED=m it means that the link RTi[i].PTR is routed m times; |
| $PGL_{RTi}$ | page length for RTi ($PGL_{RTi}$ is a power of 2, $n_{PGL_{RTi}} = \log_2 PGL_{RTi}$); |
| $Npg_{RTi}$ | number of pages of RTi: |

| SST (Sequential Search Table) | |
|---|---|
| $N_{cluster}$ | number of clusters; |
| SSLL | length of each sequential search list (Sequential Search List Length): |
| $WL_{SST}$ | word length of RTi (expressed in bit); |

The CSSA structure has are three different mode of operation:
Initialization Mode;
Configuration Mode;
Normal Operation Mode;

In the Initialization Mode the contents DAT, RTi, SST and SSTPF are initialized with default values. In the configuration mode the contents of DAT, RTi and SST have to be set to values suitable for compression of a defined set of address S to be compressed. In the normal operation mode, the algorithm finds for each incoming vector (INCVECT) fed thereto, a corresponding outcoming vector (OUTVECT) that matches the INCVECT 3.1.2 Initialization Mode In the Initialization Mode the contains of DAT, RTi, SST and SSTPF are initialized with default values:
.USED fields are initialized with 0;
.PTR fields are initialized with UNASSIGNED;
.ADDR fields are initialized with UNASSIGNED;
The pseudo-code for the Initialization Mode is:

```
/* DAT initialization */
FOR i = 1 TO N_subspace
    DAT[i].PTR = UNASSIGNED
    DAT[i].USED = 0;
END FOR;
/* RTi initialization */
FOR EACH RTi
    FOR j = 1 TO N_PG.RTi
        FOR k = 1 TO PGL_RTi
            RTi[j,k].PTR = UNASSIGNED
            RTi[j,k].USED = 0;
END FOR;
/* SST initialization */
FOR i = 1 TO N_cluster
    SST[i].PTR = UNASSIGNED
    SST[i].USED = 0;
END FOR;
/* step 0.3 (SSTPF initialization) */
FR i = 1 TO N_cluster
    SSTPF[i].USED = 0;
END FOR;
```

3.1.3 Normal Operation Mode

In the Normal Operation Mode the algorithm splits the whole space. U in '$N_{subspace}$ equal subspaces by means of the DAT. Then the elements of S, that may fall into anyone (and even into more than one) of the mentioned subspaces, are clustered in $N_{cluster}$ sets by the cascade of RTi. The result of this clustering process (that may be -visualized as a further splitting of the S set) is a cluster identifier (CLID (CLuster IDentifier)) in which the sequential search is performed; this is done in the SST. Regarding the sequential search, if one of the addresses stored in the selected cluster (i.e. the one at position SSLPOS (Sequential Search List POSition)) match (in practice the Comparison Result is monitored) with the Incoming Vector INCVECT, then the Incoming Vector is compressible and its compressed form c is represented by the pair (CLID, SSLPOS); otherwise the Incoming Vector INCVECT will not be compressed.

It is also possible to define the compressed form c as the absolute address of the row identified by the sequential search phase in the SST.

Summarizing:

if for a given INCVECT ∈ S

∃! c=(CLID, SSLPOS)|{OUTVECT=SST(c)= INCVECT}→INCVECT is compressible;

if for a given INCVECT ∈ S ∃ c=(CLID, SSLPOS) |{OUTVECT=SST(c)=INCVECT}→INCVECT is not configured for compression;

all INCVECT ∈ (U–S) are not configured for compression;

In

FIG. 12 a Translation Table (TT) is shown. This block is not part of the structure and is optional. It does not intervene in the algorithm of the invention and is shown as a simple implement to perform also an address translation, the result of which is an Outcoming TAG.

The pseudo-code for the algorithm (Normal Operation Mode branch) is:

```
MAIN(s, OUTVECT)
/* global declarative part */
TYPE PTR IS pointer to page of DAT, RTi, SST, SSTPF;
TYPE USED IS the number of different paths which pass through a specified row of DAT, RTi, SST, SSTPF;
TYPE ROW IS row location of DAT, RTi, SST, SSTPF;
TYPE ADDR IS address ∈ S;
TYPE CMPADDR : RECORD IS (PTR, ROW);
VAR s:          ADDR;
VAR outvect:    ADDR;
VAR c:          CMPADDR;       /* c ∈ C */;
BEGIN
/* local declarative part */
VAR ptr1, ptr2 : PTR;
VAR sstpf_used : USED;
VAR addr : ADDR;
    /* executive part */
    /* DAT */
    ptr1 = DAT[dat_rowsel(s)];
    IF (ptr1 = UNASSIGNED) THEN
        /* s not configured for compression: exit */
        c := {UNASSIGNED, UNASSIGNED};
        OUTVECT := UNASSIGNED;
        EXIT;
    ELSE
        /* RTi */
        FOR i=1 TO nst
            ptr2 = RTi[ptr1, rt_rowsel(s)];
            IF (ptr2 = UNASSIGNED) THEN
                /* s not configured for compression: exit */
                c := {UNASSIGNED, UNASSIGNED};
                OUTVECT := UNASSIGNED;
                EXIT;
            END IF;
        END FOR;
        /* SST */
        sstpf_used = SSTPF[ptr2].USED;
        IF (sstpf_used = 0) THEN
            /* s not configured for compression: exit */
            c := {UNASSIGNED, UNASSIGNED};
            OUTVECT := UNASSIGNED;
            EXIT;
        END IF;
        FOR i=1 TO sstpf_used
            addr = SST[ptr2].ADDR;
            IF (addr <> UNASSIGNED) THEN
                /* addr found: exit */
                c := {ptr2, sstpf_used};
                OUTVECT := addr,
                exit;
            END IF;
        END FOR;
END;
```

3.1.4 Configuration Mode

Given the set S of address to be compressed and the set C of compressed addresses the setup of CSSA consists in assigning all the parameters DAT[i].PTR, DAT[i].USED, RTi[i].PTR, RTi[i].USED to configure for compression all the elements of S set. CSSA supports both an absolute and an incremental Configuration Mode:

in an absolute mode, all elements of S are set for compression in a single Configuration Mode session, that is all parameters of DAT, RTi, SST, SSTPF are written from scratch;

in an incremental mode, new elements are configured or unconfigured for compression in and incremental way, that is without rewriting all parameters of DAT, RTi, SST, SSTPF from scratch.

The pseudo-code for the Configuration Mode is:

```
MAIN(S)
BEGIN
/* declarative part */
TYPE PTR IS pointer to page of DAT, RTi, SST, SSTPF;
TYPE ROW IS row location of DAT, RTi, SST, SSTPF;
TYPE ADDR IS address ∈ S;
VAR s:     ADDR;
VAR j:     PAGE;
VAR k:     ROW;
/* executive part */
FOR EACH s ∈ S
    /* step 1 (DAT configuration) */
    j = rt_pagesel(1,s);
    k = rt_rowsel(1,s);
    DAT[dat_rowsel(s)].PTR = j;
    RT1[j,k].USED ++;
    DAT[dat_rowsel(s)].USED ++;
    /* step 2.i (RTi configuration: fram RT1 to RTn) */
    FOR i = 1 TO (n-1)
        RTi[j,k].PTR = rt_pagesel(i+1,s);
        RTi+1[rt_pagesel(i+1,s),rt_rowsel(i+1,s)].USED ++;
        j = rt_pagesel(i+1,s);
        k = rt_rowsel(i+1,s);
    END FOR;
    /* step 3 (SST & SSTPF configuration) */
    RTn[j,k].PTR = sst_pagesel(s);
    SST[sst_pagesel(s)] = s;
    SSTPF[sst_pagesel(s),sst_rowsel(s)].USED ++;
END FOR EACH s;
END;
``` where dat_rowsel(s), rt_pagesel(i,s), rt_rowsel(i,s), sst_pagesel(s) and sst_rowsel(s) are function that are bonded, to calculate the most suitable row or page to avoid routing congestion for a specific table (DAT, RTi, SST, SSTPF) starting as input data from the address s selected for compression. The pseudo-code for the listed functions is as follows:

```
function dat_rowsel(s: INCVECT) RETURN row
TYPE ROW IS row location of DAT, RTi, SST, SSTPF;
row:row of DAT;
BEGIN
    /* slice of WL_DAT msb of s */
    row := s(n-1, n-WL_DAT);
END dat_rowsel;
function rt_rowsel(i: i-nth RT identifier, s: INCVECT) RETURN row
TYPE ROW IS row location of DAT, RTi, SST, SSTPF;
row:ROW;
BEGIN
    IF (i = 1) THEN
        /* slice of WL_RTi bits of s */
        row := s(n-WL_DAT-1, n-WL_DAT-WL_RT1);
    ELSE
        /* slice of WL_RTi bits of s */ row := s(n - WL_DAT - (sum_{h=1}^{i-1} WL_RTh) - 1,
                 n - WL_DAT - (sum_{h=1}^{i} WL_RTh));

END IF;
END rt_rowsel;
function rt_pagesel(i: i-nth RT identifier, s: INCVECT) RETURN page
TYPE PTR IS pointer to page of DAT, RTi, SST, SSTPF;
TYPE ROW IS row location of DAT, RTi, SST, SSTPF;
page:PTR;
row:ROW;
BEGIN
    row = rt_rowsel(i, s);
    tmp_used := MAXINT;
    FOR u = 1 TO PGL_RTi
        IF (tmp_used > MIN(RTi[u,row].USED) THEN
            tmp_used := MIN(RTi[u,row].USED);
        END IF;
    END FOR;
    page := tmp_used;
END rt_pagesel;
function sst_rowsel(s: INCVECT) RETURN row
TYPE ROW IS row location of DAT, RTi, SST, SSTPF;
row: ROW;
BEGIN
    /* slice of WL_SST bits of s */
    row := s(WL_SST-1,0);
END dat_rowsel;
function sst_pagesel(s: INCVECT) RETURN page
TYPE PTR IS pointer to page of DAT, RTi, SST, SSTPF;
TYPE RCW IS row location of DAT, RTi, SST, SSTPF;
VAR page:PTR;
VAR row:ROW;
BEGIN
    row = sst_rowsel(nst, s);
    tmp_used := MAXINT;
    FOR u = 1 TO SSLL
        IF (tmp_used > MIN(SST[u,row].USED) THEN
            tmp_used := MIN(SST[u,row].USED);
        END IF;
    END FOR;
    page := tmp_used;
END sst_pagesel;
```

3.1.4.1 Note on Operating Modes

The part of the algorithm that is executed in the Normal Operation Mode is wholly hardware implemented, while the part that is executed in the Configuration Mode is wholly software implemented (the implemented architecture only provides for the primitives needed by the configuration software to write the physical tables). The field USED is not really present in the physical tables, it is only present in a software image of the physical tables used by the configuration software during the configuration phase.

3.1.5 EXAMPLES

Example 1

In FIG. 14 an example of operation of the CSSA method of the invention is shown. This example helps in understanding both the Configuration Mode and the Normal Operation Mode. In this example the whole space U is represented by all the addresses of eight bits. We are interested in compressing the eighth ones belonging to U, namely: addr0, addr1, addr2, addr3, addr4, addr5, addr6, addr7, which form the set S.

Summarizing:

$U \equiv \{a_0, \ldots, a_{255}\};$ $S \equiv \{a_0, \ldots, a_7\} \equiv \{addr0, addr1, addr2, addr3, addr4, addr5, addr6, addr7\};$ $C \equiv \{a_0, \ldots, a_7\};$ The number of clusters is chosen as $N_{cluster}=4$ and the length of each cluster is set to SSLL=4. The parameter $N_{subpace}=4$ has been chosen, so that the whole space U is split in four equal subspaces: Sub0, Sub1, Sub2, Sub3. The addresses configured for compression are encoded in both hexadecimal and binary code (i.e. addr0=42 (hex)/01-00-00-10 (bin)).

The binary representation has its digits grouped into pairs (separated by '-'): the $1^{st}$ pair is loaded to split U into four subspaces (Sub0, Sub1, Sub2, Sub3); the $2^{nd}$, $3^{rd}$ and $4^{th}$ pairs are loaded to select the position within each page where to route each addri for the routing tables RT1, RT2 and RT3, respectively, (this degree of freedom is used by the configuration part of the algorithm to avoid routing congestion of a table RTi). The clustering of the elements of the S set in $N_{cluster}$ sets is performed by choosing in a proper way the pointers RTi[j.k].PTR.

Example 2

FIG. 15 shows another example of algorithm operation.

3.1.6 Algorithm Proof

The algorithm proof will be performed by a dimensioning DAT, RTi, SST and SSTPF for a given general problem and proving in a constructive way that with the calculated dimensioning, for all possible couple (INCVECT, OUTVECT), exist a set of parameters W that allows the desired transformation S→C.

The proof will be carried out following this scheme:

1. for each stage, a number of links (rows*pages) sufficient to allocate all addresses to be compressed is allocated (sufficient condition);
2. between each pair of adjacent tables a convenient partitioning (number of pages, number of rows), suitable to avoid routing congestion, is defined (sufficient condition);

Steps (1), (2) prove that between each pair of tables all the addresses, can be allocated and routed without congestion. This prove the algorithm since steps (1) and (2) are iterated on all tables starting from, the SST and propagating backward to the DAT.

3.1.6.1 Dimensioning of SST and SSTPF

The set of addresses to be compressed S has n elements. As a consequence:

$$n_{cpr} = \text{ceil}(\log_2(n_v)) \qquad (1)$$

The number of clusters $N_{cluster}$ (which must be a power of 2) is chosen depending on the required maximum duration of the sequential search phase, which depends on the length of each sequential search list (SSLL).

$$SSLL = 2^{n_{cpr}}/N_{cluster} \qquad (2)$$

So, SST is a table of $N_{cluster}$ pages where each page has SSLL rows. SSTPF is a table with $N_{cluster}$ rows.

3.1.6.2 Dimensioning of RTI—Preamble

The dimensioning of the routing tables RTi starts from the one near the SST (RTnst) and propagate backward to RT1. To characterize each RTi, three dimensions are needed:

$PGL_{RTi}$ page length for i-nth RTT ($PGL_{RTi}$ is a power of 2, $n_{PGL_{RTi}} = \log_2 PGL_{RTi}$);

$Npg_{RTi}$ number of pages of RTi;

$WL_{RTi}$ word width of RTi (expressed in bit).

It is crucial to choose the values of $Npg_{RTi}$ and $n_{PGL_{RTi}}$ sufficiently large to avoid routing congestion. To do this, a set of equations, each one taking in account each possible different kind of block condition, must be written.

3.1.6.3 Dimensioning of RTNST

Starting from the table RTnst (the one feeding the connected to SST), in order to address each page of SST the following relation must be verified.

$$WL_{RTnst} = \log_2 N_{cluster}. \qquad (3)$$

$$Npg_{RTnst} * 2^{n_{PGL}RTnst} > 2^{n_{cpr}}. \qquad (4)$$

Equation (4) defines an increment of the number of compressed addresses sufficient to ensure that in RTnst a sufficient number of links to allocate all the $n_s$ addresses belonging to S (case of fully shuffled addresses) is present. In order to set a proper value of $Npg_{RTnst}$, a strategy to avoid routing congestion must be followed.

3.1.6.3.1 No Congestion Condition

A key factor to be kept under control in any routing process is the congestion of Routing Tables; each incoming address is in fact <<routed>> to the correct cluster passing through the Routing Tables. The congestion occurs in those rows where the USED fields have a relatively high value; this happens when a lot of different addresses exhibit the same slice of bits $s(b_1, \ldots b_m)$ in the same RTi (case of fully collapsed addresses). In this case, these collapsing addresses must be split on different pages and this set the number of pages for each RTi. The following equation expresses this circumstance $$\frac{\min(2^n / 2^{n_{PGL}RTnst}, 2^{n_{cpr}})}{Npg_{RTnst}} \leq \frac{2^{n_{cpr}}}{N_{cluster}}; \qquad (5)$$

eq. (5) expresses a circumstance based on a property of binary numbers: the number of vectors of n bit which exhibit the same pattern of $n_{PGL_{RTnst}}$ adjacent bits (in any arbitrary but fixed position in the vector) is $2^n/2^{n_{PGL}RTnst}$. The number of addresses to be considered is upper bounded by $2^{n_{cpr}}$. Thus, the minimum between $2^n/2^{n_{PGL}RTnst}$ and $2^{n_{cpr}}$ must be chosen In eq. (5), the expression $\min(2^n/2^{n_{PGL}RTnst}, 2^{n_{cpr}})$ take the value $2^{n_{cpr}}$ in any pratical case, as a consequence eq. (5) becomes:

$$Npg_{RTnst} \geq N_{cluster}; \qquad (5')$$

eq.(5/5') defines a sufficient condition to avoid congestion at nst stage (RTnst).

Now, substituting eq. (5') in equation (4) we obtain:

$$N_{cluster} * 2^{n_{PGL}RTnsv} \geq 2^{n_{cpr}} \rightarrow 2^{n_{PGL}RTnsv} \geq 2^{n_{cpr}}/N_{cluster} \rightarrow$$
$$n_{PGL_{RTnst}} \geq \log_2(2^{n_{cpr}}/N_{cluster}) \rightarrow n_{PGL_{RTnst}} \geq \log_2(2^{n_{cpr}}) -$$
$$\log_2(N_{cluster}) \rightarrow$$

$$n_{PGL_{RTnst}} \geq n_{cpr} - \log_2(N_{cluster}); \qquad (6)$$

The latter relationship that must be verified for $n_{PGL_{RTnst}}$ is determined by a reachability condition.

3.1.6.3.2 Reacheability Condition

This condition imposes that all pages of SST can be reached from any fully routed page of RTnst (a page in which the USED field is different from zero for at least a row)

$$n_{PGL_{RTnst}} \geq \log_2(N_{cluster}). \qquad (7)$$

Eq. (5') and (6) and (7) give the required dimension of RTnst.

Besides dimensioning, another parameter needs to be defined in order to perform the algorithm presented in the previous paragraph: that is, the maximum reuse for each row of RTnst, that is the maximum acceptable value for the RTnst[j,k].USED field must be determined; this value will be named $n_{reuse_{RTnst}}$.

This value is calculated on the base of an allocability condition.

3.1.6.3.3 Allocability Condition

If in any row of any page of RTnst the USED field exceeds the parameter SSLL, the addresses belonging to that row will not be allocable by any page of SST (not even by an empty page because an empty page can allocate a maximum of SSLL entries). To prevent this circumstance the value for $n_{reuse_{RTnst}}$ must be bounded by SSLL:

$$n_{reuse_{RTnst}} \leq SSLL. \qquad (8)$$

When this equation is verified, the dimensioning of RTnst is completed. Summarizing:

$$WL_{RTnst} = \log_2 N_{cluster};$$
$$Npg_{RTnst} \geq N_{cluster};$$
$$n_{PGL_{RTnst}} \geq n_{cpr} - \log_2(N_{cluster});$$
$$n_{PGL_{RTnst}} \geq \log_2(N_{cluster}).$$

To save memory and to simplify hardware implementation:

$WL_{RTnst} = \log_2(N_{cluster})$;
$Npg_{RTnst} \geq N_{cluster}$;
$n_{PGL_{RTnst}} \geq n_{cpr} - \log_2(N_{cluster})$;
$n_{PGL_{RTnst}} \geq \log_2(N_{cluster})$.

3.1.6.4 Dimensioning of RTI

For all the other RTi different from RTnst, the above remains valid by substituting $N_{cluster}$ with $Npg_{RTnst}$. Thus:

$$WL_{RTi} = \log_2(Npg_{RTi}); \qquad (9)$$

and the following equation sets an increment for the number of compressed addresses $$Npg_{RTi} * 2^{n_{PGL}RTi} > 2^{n_{cpr}}, \qquad (10)$$

sufficient to ensure that in the i-nth stage (RTi), a sufficient number of links to allocate all the n, addresses belonging to S (case of fully shuffled addresses) is available.

As for RTnst, the maximum reuse for each row of RTi, that is the maximum acceptable value for the RTi[j,k].USED field must be determined in order to perform the algorithm presented in the previous paragraph; this value will be named $n_{reuse_{RTi}}$ and is calculated on the base of the allocability condition.

3.1.6.4.1 Allocability Condition

If in any row of any page of any Rti, the USED field exceeds a certain function of the next RTi (RTi+1), the addresses belonging to that row will not be allocable by any row of any page of RTi+1 (not even by an empty page because an empty page of RTi+1 can allocate a maximum of $PGL_{RTi}+1 * n_{reuse_{RTi+1}}$ entries). If this bound is exceeded, $n_{reuse_{RTi+1}}$ will be exceeded somewhere in RTi+1 and so on up to reach RTnst and eventually SST where the overallocation error (RTnst[j,k].USED>SSLL) will be evidenced. The bound $PGL_{RTi+1} * n_{reuse_{RTi+1}}$ is valid when the addresses routed by a row of RTi are symmetrically split among the $PGL_{RTi+1}$ rows of a page of RTi+1; this is an optimistic circumstance. In the worst case all these addresses falls into the same row and consequently the bound will be $n_{reuse_{RTi+1}}$.

Summarizing:

$n_{reuse_{RTi}} \leq PGL_{RTi+1} * n_{reuse_{RTi+1}}$ all addresses are symmetrically split into $PGL_{RTi+1}$ row of a page of $RTi+1$; (11)

$n_{reuse_{RTi}} \leq n_{reuse_{RTi+1}}$ all addresses fall into the same row of a page of $RTi+1$; (12)

To set the less strict condition as a bound, a couple of equations must be simultaneously verified on both RTi and RTi+1; so the following system must be verified for each pair of adjacent Rti.

$$\begin{cases} n_{reuse_{RTi}} \leq PGL_{RTi+1} * n_{reuse_{RTi+1}}; \\ RTi+1[j \cdot k] \cdot USED \leq n_{reuse_{RTi+1}}; \forall i, j, k; \end{cases}$$ (13)

Taking into account that $n_{reuse_{RTi+1}}$ can not be exceeded, it can be considered as SSLL for SST in case of fully collapsed addresses, so the no congestion condition remain valid by substituting $N_{cluster}$ with $Npg_{RTi+1}$ $$\frac{\min(2^n/2^{nPGL_{RTi}}, 2^{n_{cpr}})}{Npg_{RTi}} \leq \frac{2^{n_{cpr}}}{Npg_{RTi+1}},$$ (14)

where $Npg_{RTi+1}$ is known. Eq.(14) can be simplified as previously done with eq.(5) and this leads to $Npg_{RTi} \geq Npg_{RTi+1};$ (14')

eq.(14/14') represents sufficient condition to avoid congestion at the i-nth stage.

Now, by substituting eq. (14') in equation (10) we obtain:

$Npg_{RTi} * 2^{nPGL_{RTi}} \geq 2^{n_{cpr}} \rightarrow 2^{nPGL_{RTi}} \geq 2^{n_{cpr}}/NPG_{RTi} \rightarrow$
$n_{PGL_{RTi}} \geq \log_2(2^{n_{cpr}}/Npg_{RTi}) \rightarrow n_{PGL_{RTi}} \geq \log_2(2^{n_{cpr}}) - \log_2(Npg_{RTi}) \rightarrow$ $n_{PGL_{RTi}} \geq n_{cpr} - \log_2(Npg_{RTi});$ (15)

To save in memory requisite, the same number of pages can be allocated for each RTi: $Npg_{RTi}=Npg_{RTi+1}$.

The last condition that needs to be verified for $n_{PGL_{RTi}}$ is still set by the reachability condition.

3.1.6.4.2 Reacheability Condition

This condition impose that all the pages of RTi+1 can be reached from any fully routed page of RTi (a page in which the USED field is different from zero for anyone row):

$n_{PGL_{RTi}} \geq \log_2(Npg_{RTi+1}).$ (16)

Eq. (14') and (15) and (16) give the dimension of RTi $\forall$ i<nst. Summarizing:

$WL_{RTi}=\log_2(Npg_{RTi+1});$ $Npg_{RTi} \geq Npg_{RTi+1};$ $n_{PGL_{RTi}} \geq n_{cpr}-\log_2(Npg_{RTi});$ $n_{PGL_{RTi}} \geq \log_2(Npg_{RTi+1}).$ To save memory and to simplify the hardware implementation:

$WL_{RTi} = \log_2(N_{cluster})$;
$Npg_{RTi} \geq N_{cluster}$;
$n_{PGL_{RTi}} \geq n_{cpr} - \log_2(N_{cluster})$;
$n_{PGL_{RTi}} \geq \log_2(N_{cluster}).$

3.1.6.5 Dimensioning of DAT

The slices of bits which address the rows of each DAT, RTi are related by the following equation $$n = \log_2(N_{subspace}) + \sum_{h=1}^{nst} \log_2(PGL_{RTi}) \rightarrow n = n_{subspace} + \sum_{h=1}^{nst} n_{PGL_{RTi}};$$ (17)

so, $$n_{subspace} = n - \sum_{h=1}^{nst} n_{PGL_{RTi}}.$$ (18)

Regarding the parameter $WL_{DAT}$ it is set by eq.(19)

$WL_{DAT}=\log_2(Npg_{RT1}).$ (19)

Eq.(18) and (19) give the dimension of DAT $$n_{subspace} = n - \sum_{h=1}^{nst} n_{PGL_{RTi}};$$

$WL_{DAT}=\log_2(Npg_{RT1}).$

Assuming $Npg_{RT1}=N_{cluster}$, as previously done with RTi $$n_{subspace} = n - \sum_{h=1}^{nst} n_{PGL_{RTi}};$$

$WL_{DAT}=\log_2(N_{cluster}).$

3.1.7 About the Algorithm

As already assumed a proof that routing congestion will be prevented implies that allocation of $n_{reuse\_RTi}$ links be not exceeded. This is done by monitoring all the fields RTi[j,k].USED during a Configuration Mode phase will allocating links on the emptiest pages. This allocation strategy may be referred as <<maximum spread>> since it spreads the addresses on the largest possible number of pages.

3.2 Extensions of the CSSA Technique

Performances of a CSSA system can be further improved by modifying the algorithm. These alternative embodiments of the basic CSSA technique of the invention will be referred to as EXTENDED CSSA followed by the notation #1, #2, #3, #4 for identifying as many alternative embodiments. Two kinds of improvements can be obtained:

1) further decreasing memory size (Msize);
2) further decreasing number of clock cycles needed to carry out the algorithm (Nclk).

3.2.1 Extended CSSA #1

Basic CSSA algorithm can be further improved modifying the sequential search phase. The extension is named EXTENDED CSSA#1. Two kinds of improvements can be obtained: further decreasing memory size (Msize) or further decreasing number of clock cycles needed to carry out the algorithm (Nclk).

These further improved embodiments generally imply replacing the Sequential Search step with an Extended Sequential Search step. In architectural terms this means replacing the SST (Sequential Search Table) with an ESST (Extended Sequential Search Table) as in

FIG. 16.

An architecture of ESST block according to a first embodiment (EXTENDED CSSA #1) is shown in

FIG. 17.

The ESST block is built with a bank of Nsst $SST_1$, with Nsst independent Address Generators, each Address Generator generating an address for the corresponding $SST_i$. A set of Nssti comparators which compare the result of the search for each SSTi with the Incoming Vector (INCVECT) complete the architecture. As the CLuster Identifier (CLID) is provided, the search phase starts in parallel on all the SSTis. As soon as a SSTi finds the Compressed Address, the search stops, the. Compressed Address is sent out and validated through the Outcoming Vector Validation.

To better understand the magnitude of the improvement it is useful to compare a basic CSSA system with an EXTENDED CSSA#1 system for solving the same compression problem.

a) The SST in the CSSA is defined by these parameters:

Ncluster_sst number of clusters (pages) of SST;

SSLL_sst number of rows of each page of SST.

Regarding the Memory Requirements the CSSA is characterized by these parameters:

Msize_dat_cssa amount of memory needed by DAT in CSSA;

Msize_rt_cssa amount of memory needed by all the RTi in CSSA;

Msize_sst amount of memory needed by SST in CSSA;

Msize_cssa=Msize_dat_cssa+Msize_rt_cssa+Msize_sst.

Regarding the speed Requirements the CSSA is characterized by these parameters:

Nclk_dat_cssa number of clock cycles needed to perform the CSSA algorithm through DAT in CSSA;

Nclk_rt_cssa number of clock cycles needed to perform the CSSA algorithm through all the RTi in CSSA;

Nclk_sst number of clock cycles needed to perform the CSSA algorithm through SST in CSSA;

Nclk_cssa=Nclk_dat_cssa+Nclk_rt_cssa+Nclk_sst_cssa (total number of clock cycles to perform the CSSA algorithm).

b) The ESST in the EXTENDED CSSA#1 is defined by these parameters:

Nssti number of SSTi which are instantiated in ESST;

Ncluster_ssti number of cluster (pages) of each SSTi;

SSLL_ssti number of rows of each page of each SSTi;

Regarding the Memory Requirements the Extended CSSA#1 in characterized by these parameters:

Msize_dat_ecssa amount of memory needed by DAT in EXTENDED CSSA#1;

Msize_rt_ecssa amount of memory needed by all the RTi in EXTENDED CSSA#1;

Msize_esst_ecssa amount of memory needed by all the SSTi in EXTENDED CSSA#1;

Regarding the Speed Requirements the Extended CSSA#1 in characterized by these parameters:

Nclk_dat_ecssa number of clock cycles needed to perform the CSSA algorithm through DAT in EXTENDED CSSA#1;

Nclk_rt_ecssa number of clock cycles needed to perform the CSSA algorithm through all the RTi in EXTENDED CSSA#1;

Nclk_esst_ecssa number of clock cycles needed to perform the CSSA algorithm through all the SSTi in EXTENDED CSSA#1;

Nclk_ecssa=Nclk_dat_ecssa+Nclk_rt_ecssa+Nclk_esst_ecssa (total number of clock cycles to perform the EXTENDED CSSA#1 algorithm).

If the goal is Msize reduction the parameters are set to obtain the maximum saving in memory requirements and the relationship between a basic CSSA system and a system according to the embodiment: EXTENDED CSSA #1 is:

Ncluster_ssti=Ncluster_sst for each i;

SSLL_ssti=SSLL_sst:

each cluster in EXTENDED CSSA#1 is multiplied by a Nssti factor, but being used Nssti SSTi tables in parallel the total Sequential Search phase is still the same as in the normal CSSA.

As a consequence of this parameters setting, the time performances are

Nclk_dat_ecssa=Nclk_dat_cssa;

Nclk_rt_ecssa=Nclk_rt_cssa;

Nclk_esst_ecssa=Nclk_sst_cssa.

Being the total number of clock cycles dominated by Nclk_esst_ecssa in EXTENDED CSSA#1 and by Nclk_sst_cssa in CSSA, we can state that Nclk_ecssa≅Nclk_cssa;

this is only a rough estimation, the effective time performance is even better, due to the possible reduction of the number of RTi stages, as result of the increased dimension of clusters in the EXTENDED CSSA#1 case.

The memory requirements are

Msize_esst_ecssa=Msize_sst_cssa*Nssti;

this is the only memory increase because, as will be proved in the next paragraph devoted to performance comparison, Msize_dat_ecssa<Msize_dat cssa;

Msize_rt_ecssa<Msize_rt_cssa;

as a consequence,

Msize_ecssa<Msize_cssa.

If the goal is Nclk reduction, the parameters will be set to obtain the maximum gain in speed, while keeping constant the total amount of memory, the relationship between a basic CSSA system and a system according to the embodiment EXTENDED CSSA #1 is:

Ncluster_ssti =Ncluster_sst for each i;

SSLL_ssti=SSLL_sst/Nssti; Nssti must be chosen so that SSLL_ssti>1.

each cluster in EXTENDED CSSA#1 still has the same size as in CSSA, but being used Nssti ssti in parallel the total Sequential Search phase is reduced by a Nssti factor.

As a consequence of this parameters setting, the memory requirements are

Msize_dat_ecssa=Msize_dat_cssa;
Msize_rt_ecssa=Msize_rt_cssa;
Msize_esst_ecssa=Msize_sst_cssa;

thus,

Msize_ecssa=Msize_cssa.

Regarding the time performances,

Nclk_dat_ecssa=Nclk_dat_cssa;
Nclk_rt_ecssa=Nclk_rt_cssa;
Nclk_esst_ecssa=Nclk_sst_cssa/Nssti.

Being the total number of clock cycles is dominated by Nclk_esst_ecssa in EXTENDED CSSA#1 and by Nclk_sst_cssa in CSSA, we can state that Nclk_ecssa≅Nclk_cssa/Nssti.

3.2.2 Extended CSSA #2

Another embodiment of the basic CSSA can be realized with yet another ESST implementation.

This embodiment is shown in

FIG. 18.

Instead of a plurality of SST wide as the incoming vector, as in EXTENDED CSSA#1, it is possible to use a single, wide memory, large as the incoming vector width multiplied by Nsst. In this case a single address generator is needed, but Nsst comparators are needed.

In any case the performances obtained with the EXTENDED CSSA#1 and the EXTENDED CSSA#2 are equivalent.

3.2.3 Extended CSSA #3

Another possible embodiment of the CSSA, EXTENDED CSSA#3, is based on splitting of the algorithm in two different steps, named respectively Cluster Detection and Sequential search. Each step can last till to one cell (packet) time, due to the two fifo pipeline, that is implemented as depicted in

FIG. 19.

In the first phase (Cluster Detection) the DAT and RTi analysis are performed, and a cluster identifier (CLID) is detected.

In the second step the Sequential Search is performed to find the compressed identifier.

According to this embodiment it is possible to increase the cluster size, with strong benefits in terms of memory size reduction. The price to pay is a latency of two cells (packets) as compared to the "standard" CSSA latency of one cell.

In any case the Msize reduction is limited by the size of the SST, that must be at least equal to the minimum theoretical size (CAM).

This embodiment can be easily coupled with either the EXTENDED CSSA #1 or the EXTENDED CSSA #2 architecture to increase the cluster size again.

3.2.4 Extended CSSA #4

Yet another and particularly efficient embodiment of the basic CSSA technique of this invention may be suitable to compress different classes or sets of addresses $S_1, S_2, \ldots, S_{Nclasses}$, the sets of addresses to be compressed (whose union is named S), belonging to the set U, the whole addressing space.

For each address belonging to the generic set $S_i$ the algorithm must identify one and only one address belonging to $C_i$, the set of compressed addresses which corresponds to the set $S_i$ (i.e. perform a transformation $S_i \to C_i$); this must be verified $\forall j \in 1, \ldots, \text{Nclass}$.

An example of graphical representation of this problem is given in FIG. 20. According to this embodiment (EXTENDED CSSA #4), a combination of the three fundamental steps of the basic algorithm: splitting of S in subspaces via direct addressing table (DAT), clustering via routing tables ($RT_{ij}$) and sequential search via at least Nclass sequential search table ($SST_j$), are used.

However, the system of this embodiment combines in a tree, with an arbitrary number of levels, different Clustering phases (RTi,branch j-nth) working in parallel and originating from a common branch, said common branch being the end point of a Splitting phase (DAT) plus a Clustering (RT1_root, RTi_root, ..., RTn_root) phase which is the common ancestor of all the branches, each leaf of the tree being constituted by a Sequential Search phase (SST branch j-nth). This leads to a structure that may be described as a "RT tree".

FIG. 21 shows the general structure of an EXTENDED CSSA#4 system.

The system behaves in different ways depending on the incoming vector domains, and the various SST branch j-nth and RTi,j-nth_branch are tuned in a most efficient way. This architecture allows memory savings by sharing the DAT and some RTi,j-nth_branch before any branching off.

An example of implementation is depicted in FIG. 22.

This embodiment is particularly suitable for IP and multicast applications.

3.3 Performance Comparison

In order to perform a correct benchmarking between various address compression techniques, it is useful to define the main parameters of a generic <<address compression function>>.

FIG. 23 shows the parameters used to evaluate the architectures.

$2^N$ is the number of possible incoming identifiers (N is the length, in bits)

$2^{Ncpr}$ is the number of possible Compressed identifiers (Ncpr is the length, in bits)

AVclk is the minimum packet interarrival/cell time (in clock cycles)

Nclk is the number of clock cycles needed to perform address compression

Msize is the total memory size needed to perform address compression

Nmem is the number of physical memory needed

The parameter N typically dominates the memory size requisite and the Ncpr parameter the complexity of the compression process.

Any architecture will be constrained to consume no more clock cycles (Nclk) than Avclk.

The RAM requisite Msize provides the indicator of the efficiency of the processing structure.

Two scenarios have been investigated: the <<ATM>> and the <<IP>>. Both scenarios have been tested by supposing a 622 Mbit/s (STM-4) full throughput. Obviously, other speed assumptions (e.g 155 Mbit/s or 1.3 Gbit/s) will imply a fully different comparison results. A 622 Mbit/s throughput has been chosen in order to be in line with present trends in ATM switches and IP router technology.

The <<ATM>> scenario implies N=24 bits. Assuming 53 bytes/cell, to prove these architectures at 622 Mbit/s it means Avclk=26.

The <<IP>> scenario implies N=32 bits. Assuming 64 bytes for the shortest packet, to prove these architectures at 622 Mbit/s it means AVclk=32.

TABLE 1

| Input parameter for benchmarking | | |
| --- | --- | --- |
| Scenario | N | AVclk |
| <<ATM>> | 24 | 26 |
| <<IP>> | 32 | 32 |

Each architecture will be tested, for each scenario, for any Ncpr value between 2 and 16: this means examining the performance over a very wide range of possible applications.

By writing the performance as an equation and the constraint as a disequation, it is possible to state:

$M\text{size}=F(N, Ncpr, P1, P2, \ldots)$ for $Ncpr \in (2 \ldots 16)$ $N\text{clk}=G(N, Ncpr, P1, P2, \ldots) \leq AVclk$ for $Ncpr \in (2 \ldots 16)$ P1, P2, etc are <<technique dependent free parameters>>. For example, when dealing with a Binary Tree Algorithm the free parameter is the number of stages Nst; when using a Clustered Sequential Search Algorithm the free parameter is the cluster size, SSLL.

In order to arrive at an objective performance evaluation, for each technique, the analysis has been performed using the <<good designer approach>>: for each technique, for each W, for each Ncpr, the best value of the free parameter (the value that minimizes Msize) has been identified and applied. FIG. 24 shows this concept.

As far as the dis-equation Nclk≦Avclk is concerned, it is possible to argue that, if the clock that reads the memories $M_1 \ldots M_{Nmem}$ is faster (e.g. double) than the clock of the incoming serial stream (address) the performance of the system can be improved. This is true, but, because the same <<trick>> could be applied with the same benefits to any technique, a <<common reference clock>> has been defined in order to perform a real comparison.

The applied<<reference clock>> is the clock related to the incoming address.

3.3.1 CAM Performance

The analysis of CAM is really fast. The number of requested bits is $M\text{size}=N*2^{Ncpr}(\text{bits})$ There are no free parameters, and the Nclk will be, in any case, less then Avclk. Nmem obviously is 1

TABLE 2

| Msize for <<ATM>> scenario performing CAM For <<ATM>> scenario (N = 24): | |
| --- | --- |
| Ncpr | Msize |
| 2 | 96 |
| 3 | 192 |
| 4 | 384 |
| 5 | 768 |
| 6 | 1536 |
| 7 | 3072 |
| 8 | 6144 |
| 9 | 12288 |
| 10 | 24576 |
| 11 | 49152 |
| 12 | 98304 |
| 13 | 196608 |
| 14 | 393216 |
| 15 | 786432 |
| 16 | 1572664 |

TABLE 3

| Msize for <<IP>> scenario performing CAM For <<IP>> scenario (N = 32): | |
| --- | --- |
| Ncpr | Maize |
| 2 | 128 |
| 3 | 256 |
| 4 | 512 |
| 5 | 1024 |
| 6 | 2048 |
| 7 | 4096 |
| 8 | 8192 |
| 9 | 16384 |
| 10 | 32768 |
| 11 | 65536 |
| 12 | 131072 |
| 13 | 262144 |
| 14 | 524288 |
| 15 | 1048576 |
| 16 | 2097152 |

With Ncpr=16 (2^16=64K compressed identifiers) around 1.5 and 2 Mbits of CAM are needed.

There is to point out that CAM cell is more complex respect to conventional RAM, and that serious technology problems arise increasing its size.

3.3.2 Pure Sequential Search Algorithm Performance

An analysis of the efficiency of a sequential search algorithm is rather immediate.

The Add vector scans the memory M and, if a data in the memory matches the incoming address value, the compressed identifier is set equal to the memory Add. The process summarized in FIG. 25.

The number of bits requested is $$M\text{size}=N*2^{Ncpr}(\text{bits}) \qquad (1)$$

and the clock cycles needed are $$N\text{clk}=2^{Ncpr} \qquad (2)$$

Obviously, this technique can be applied only with small Ncpr (2 to 4,5) values. Nmem is 1. The following tables describe the requisites for the two considered scenarios.

TABLE 4

Msize for <<ATM>>
scenario performing Pure
Sequential
For <<ATM>> scenario (N =24):

| Ncpr | Nclk | Msize |
|---|---|---|
| 2 | 4 | 96 |
| 3 | 8 | 192 |
| 4 | 16 | 384 |
| 5 | 32 | 768 |
| 6 | 64 | 1536 |
| 7 | 128 | 3072 |
| 8 | 256 | 6144 |
| 9 | 512 | 12288 |
| 10 | 1024 | 24576 |
| 11 | 2048 | 49152 |
| 12 | 4096 | 98304 |
| 13 | 8192 | 196608 |
| 14 | 16384 | 393216 |
| 15 | 32768 | 786432 |
| 16 | 65536 | 1572864 |

TABLE 5

Msize for <<IP>> scenario
performing Pure Sequential
For <<IP>> scenario (N = 32):

| Ncpr | Nclk | Msize |
|---|---|---|
| 2 | 4 | 128 |
| 3 | 8 | 256 |
| 4 | 16 | 512 |
| 5 | 32 | 1024 |
| 6 | 64 | 2048 |
| 7 | 128 | 4096 |
| 8 | 256 | 8192 |
| 9 | 512 | 16384 |
| 10 | 1024 | 32768 |
| 11 | 2048 | 65536 |
| 12 | 4096 | 131072 |
| 13 | 8192 | 262144 |
| 14 | 16364 | 524288 |
| 15 | 32768 | 1048576 |
| 16 | 65536 | 2097152 |

TABLE 6

Msize for <<ATM>>
scenario performing Extended
Sequential search
For <<ATM>> scenario (N = 24):

| Ncpr | Nclk | Msize | Nmem |
|---|---|---|---|
| 2 | 4 | 96 | 1 |
| 3 | 8 | 192 | 1 |
| 4 | 16 | 384 | 1 |
| 5 | 16 | 768 | 2 |
| 6 | 16 | 1536 | 4 |
| 7 | 16 | 3072 | 8 |
| 8 | 16 | 6144 | 16 |
| 9 | 32 | 12288 | 16 |
| 10 | 64 | 24576 | 16 |
| 11 | 128 | 49152 | 16 |
| 12 | 256 | 98304 | 16 |
| 13 | 512 | 196608 | 16 |
| 14 | 1024 | 393216 | 16 |
| 15 | 2048 | 786432 | 16 |
| 16 | 4096 | 1572864 | 16 |

TABLE 7

Msize for <<IP>> scenario
performing Extended Sequential
search
For <<IP>> scenario (N = 32):

| Ncpr | Nclk | Msize | Nmem |
|---|---|---|---|
| 2 | 4 | 128 | 1 |
| 3 | 8 | 256 | 1 |
| 4 | 16 | 512 | 1 |
| 5 | 32 | 1024 | 1 |
| 6 | 32 | 2048 | 2 |
| 7 | 32 | 4096 | 4 |
| 8 | 32 | 8192 | 8 |
| 9 | 32 | 16384 | 16 |
| 10 | 64 | 32768 | 16 |
| 11 | 128 | 65536 | 16 |
| 12 | 256 | 131072 | 16 |
| 13 | 512 | 262144 | 16 |
| 14 | 1024 | 524288 | 16 |
| 15 | 2048 | 1048576 | 16 |
| 16 | 4096 | 2097152 | 16 |

3.3.3. Extended Sequential Search Algorithm Performance

In this case a free parameter exist. It is the number of memories where it is possible to perform simultaneously a sequential search (Nmem). For each memory, an Add(i) vector scan M(i) and, if a data in a memory (i) matches the incoming address value, the compressed identifier is set equal to the memory (i) concatenated to Add. The process is summarized in The number of bits requested is $$M\text{size}=N*2^{Ncpr}(\text{bits}) \quad (1)$$

and the clock cycles needed are $$N\text{clk}=(2^{Ncpr}/N\text{mem}) \quad (2)$$

Unfortunately, the number of memories that is possible to put in place is limited, and 8 (at most 16!) may be regarded as the largest possible value for Nmem. This limit $2^{Ncpr}$ to 256, 512. The following tables show the requisite for the two scenarios.

3.3.4 Binary Tree Algorithm Performance

FIG. 27 shows the structure for a binary tree search. The N-bit wide incoming address is split into different vectors of size W0, W1, W2, W(Nst−1), obviously providing for $$N=\Sigma Wi, \text{ for } i=0, (Nst-1) \quad (1)$$

These addresses are sent to Nst different memory banks (these banks may be organized in a single physical memory array: Nmem=1). The output data belonging to bank i is used, concatenated with W(i+1), to address the bank (i+1). In this way any bank is Ncpr bit wide and the number of address bits needed is $$Add(DAT)=W0 \quad (2)$$

$$Add(RTi)=Wi+Ncpr \quad (3)$$

Because there is no gain in having different values for Add(RTi), it may be set $$Wi=W\tilde{}, \text{ for } i=1, Nst-1 \quad (4)$$

By applying the (4) in the (1):

$$N=W0+(Nst-1)*W\tilde{} \quad (5)$$

To minimize the global needed memory, the depth of the DAT must be less or equal to the depth of the other memories $$W0 \leq W\hat{} + Ncpr \quad (6)$$

By combining the (5) and the (6):

$$W\hat{} \geq (N-Ncpr)/Nst \quad (7)$$

therefore, the following is implemented $$W\hat{} = \text{ceil}((N-Ncpr)/Nst) \quad (8)$$

The equation (8) will be used to size any memory applied in the technique using Nst as a free parameter.
The number of clock cycles needed is $$Nclk = 2 * Nst \quad (8)$$

The <<2>> factor appears because the address used to access the <<next>> memory bank is written in the <<actual>>: a clock cycle is needed to read the <<actual>> and another to prepare the address for the <<next>>.

TABLE 8

Nclk as a function of Nst

| Nst | 2 | 3 | 4 | 5 | 6 | 7 | 8 |
|---|---|---|---|---|---|---|---|
|  | 4 | 6 | 8 | 10 | 12 | 14 | 16 |

This shows that the technique remains valid in any scenario.

The performance is
$$Msize = (Ncpr+1)*2^{W0} + (Nst-1)*(Ncpr+1)*2^{(W\hat{}+Ncpr)} \quad (9)$$

Any bank is considered (Ncpr+1) bits wide because an <<active>> bit is needed, for each address.

As an example of the work performed to evaluate the technology, table 9 shows the $W\hat{}$ parameter, calculated by applying equation (7) in <<ATM>> scenario.

TABLE 9

$W\hat{}$ as a function Ncpr and Nst, with N = 24

| Ncpr \ Nst | 2 | 3 | 4 | 5 | 6 | 7 | 8 |
|---|---|---|---|---|---|---|---|
| 2 | 11 | 8 | 6 | 5 | 4 | 4 | 3 |
| 3 | 11 | 7 | 6 | 5 | 4 | 3 | 3 |
| 4 | 10 | 7 | 5 | 4 | 4 | 3 | 3 |
| 5 | 10 | 7 | 5 | 4 | 4 | 3 | 3 |
| 6 | 9 | 6 | 5 | 4 | 3 | 3 | 3 |
| 7 | 9 | 6 | 5 | 4 | 3 | 3 | 3 |
| 8 | 8 | 6 | 4 | 4 | 3 | 3 | 2 |
| 9 | 8 | 5 | 4 | 3 | 3 | 3 | 2 |
| 10 | 7 | 5 | 4 | 3 | 3 | 2 | 2 |
| 11 | 7 | 5 | 4 | 3 | 3 | 2 | 2 |
| 12 | 6 | 4 | 3 | 3 | 2 | 2 | 2 |
| 13 | 6 | 4 | 3 | 3 | 2 | 2 | 2 |
| 14 | 5 | 4 | 3 | 2 | 2 | 2 | 2 |
| 15 | 5 | 3 | 3 | 2 | 2 | 2 | 2 |
| 16 | 4 | 3 | 2 | 2 | 2 | 2 | 1 | table 10 and table 11 show the equation Msize=F(N, Ncpr, Nst).

In the last two columns the best performance value in terms of a lowest value of Msize(N, Ncpr) is pointed out, together with the related value of Nst.

TABLE 10

Msize as function of Nst and Ncpr in ATM scenario

| Ncpr \ Nst | 2 | 3 | 4 | 5 | 6 | 7 | 8 | Msize | Nst |
|---|---|---|---|---|---|---|---|---|---|
| 1 | 73728 | 9984 | 3264 | 1968 | 1200 | 1347 | 792 | 792 | 8 |
| 2 | 163840 | 16384 | 8448 | 5184 | 3136 | 2048 | 2080 | 2048 | 8 |
| 3 | 245760 | 35840 | 12800 | 7680 | 7760 | 4800 | 5160 | 4800 | 7 |
| 4 | 491520 | 79872 | 27648 | 16896 | 18528 | 11136 | 12336 | 11136 | 7 |
| 5 | 688128 | 114688 | 60928 | 37632 | 25088 | 25536 | 28728 | 25088 | 7 |
| 6 | 1310720 | 229376 | 135168 | 83968 | 53248 | 57856 | 65600 | 53248 | 6 |
| 7 | 1769472 | 479232 | 184320 | 186624 | 115200 | 129600 | 82944 | 82944 | 8 |
| 8 | 3276800 | 655360 | 368640 | 245760 | 250880 | 287360 | 174080 | 174080 | 8 |
| 9 | 4325376 | 1261568 | 765952 | 495616 | 546304 | 360448 | 371712 | 360448 | 7 |
| 10 | 7864320 | 2555904 | 1622016 | 1032192 | 1185792 | 737280 | 798720 | 737280 | 7 |
| 11 | 10223616 | 3407872 | 2129920 | 2183168 | 1490944 | 1544192 | 1717248 | 1490944 | 6 |
| 12 | 18350080 | 6422528 | 4128768 | 4644864 | 2981888 | 3268608 | 3684352 | 2981888 | 6 |
| 13 | 23592960 | 12779520 | 8355840 | 5898240 | 6144000 | 6942720 | 7879680 | 5898240 | 5 |
| 14 | 41943040 | 16777216 | 17301504 | 11534336 | 12845056 | 14745600 | 16793600 | 11534336 | 5 |
| 15 | 53477376 | 31195136 | 22282240 | 23396352 | 27017216 | 31264768 | 20054016 | 20054016 | 8 |

TABLE 11

Msize as function of Nst and Ncpr in IP scenario

| Ncpr \ Nst | 2 | 3 | 4 | 5 | 6 | 7 | 8 | Msize | Nst |
|---|---|---|---|---|---|---|---|---|---|
| 1 | 1179648 | 49152 | 13056 | 4608 | 2688 | 2700 | 1584 | 1584 | 8 |
| 2 | 2621440 | 114688 | 33792 | 11264 | 6656 | 7184 | 4160 | 4160 | 8 |
| 3 | 3932160 | 266240 | 51200 | 26880 | 16000 | 10240 | 10320 | 10240 | 8 |
| 4 | 7864320 | 393216 | 110592 | 62976 | 37632 | 23040 | 24672 | 23040 | 7 |
| 5 | 11010048 | 802816 | 243712 | 145152 | 86912 | 51968 | 57456 | 51968 | 7 |
| 6 | 20971520 | 1703936 | 540672 | 196608 | 197632 | 116736 | 131200 | 116736 | 7 |
| 7 | 28311552 | 2359296 | 737280 | 405504 | 258048 | 260352 | 165888 | 165888 | 8 |
| 8 | 52428800 | 4587520 | 1474560 | 860160 | 532480 | 576000 | 348160 | 348160 | 8 |
| 9 | 69206016 | 9371648 | 3063808 | 1847296 | 1126400 | 1264384 | 743424 | 743424 | 8 |
| 10 | 125829120 | 12582912 | 6488064 | 3981312 | 2408448 | 1572864 | 1597440 | 1572864 | 7 |
| 11 | 163577856 | 23855104 | 8519680 | 5111808 | 5165056 | 3194880 | 3434496 | 3194880 | 7 |
| 12 | 293601280 | 47710208 | 16515072 | 10092544 | 11067392 | 6651904 | 7368704 | 6651904 | 7 |
| 13 | 377487360 | 62914560 | 33423360 | 20643840 | 13762560 | 14008320 | 15759360 | 13762560 | 6 |
| 14 | 671088640 | 117440512 | 69206016 | 42991616 | 27262976 | 29622272 | 33587200 | 27262976 | 6 |
| 15 | 855638016 | 231735296 | 89128960 | 90243072 | 55705600 | 62668800 | 40108032 | 40108032 | 8 |

In the tables are reported the overall performances for a binary tree search can be applied with any Ncpr value.

TABLE 12

Msize for <<ATM>> scenario performing Binary Tree search
For <<ATM>> scenario (N = 24):

| Ncpr | Nclk | Msize | Nst |
|---|---|---|---|
| 2 | 16 | 792 | 8 |
| 3 | 16 | 2048 | 8 |
| 4 | 14 | 4800 | 7 |
| 5 | 14 | 11136 | 7 |
| 6 | 14 | 25088 | 7 |
| 7 | 12 | 53248 | 6 |
| 8 | 16 | 82944 | 8 |
| 9 | 16 | 174080 | 8 |
| 10 | 14 | 360448 | 7 |
| 11 | 14 | 737280 | 7 |
| 12 | 12 | 1490944 | 6 |
| 13 | 12 | 2981888 | 6 |
| 14 | 10 | 5898240 | 5 |
| 15 | 10 | 11534336 | 5 |
| 16 | 16 | 20054016 | 8 |

TABLE 13

Msize for <<IP>> scenario performing Binary Tree search
For <<IP>> scenario (N = 32):

| Ncpr | Nclk | Msize | Nst |
|---|---|---|---|
| 2 | 16 | 1584 | 8 |
| 3 | 16 | 4160 | 8 |
| 4 | 16 | 10240 | 8 |
| 5 | 14 | 23040 | 7 |
| 6 | 14 | 51968 | 7 |
| 7 | 14 | 116736 | 7 |
| 8 | 16 | 165888 | 8 |
| 9 | 16 | 348160 | 8 |
| 10 | 16 | 743424 | 8 |
| 11 | 14 | 1572864 | 7 |
| 12 | 14 | 3194880 | 7 |
| 13 | 14 | 6651904 | 7 |
| 14 | 12 | 13762560 | 6 |
| 15 | 12 | 27262976 | 6 |
| 16 | 16 | 40108032 | 8 |

It is evident the fact that implementation of a binary tree search algorithm is almost 10 lines more burdensome than the implementation of a CAM technique 3.3.5 Clustered Sequential Search Algorithm Performance FIG. 3–7 shows the structure that implements a Clustered Sequential search algorithm of the invention.

Let Cs be the size of the clusters, formerly addressed as SSLL.

For each cluster, the number of locations is $2^{Cs}$.

Let $2^{Cn}$ be the number of clusters, formerly addressed as Ncluster. Moreover, let $C_j$ be the j-th cluster.

The N bit wide incoming address is split into different vectors of size W0, W1, W(Nst−1), obviously verifying that:

$$W = \Sigma W_i, \text{ for } i=0, (Nst-1) \quad (1)$$

These addresses are sent to Nst different memory banks, called DAT and RTi respectively. These banks may be organized in the same physical memory.

The output data belonging to Rti, concatenated with W(i+1) is used to address RT(i+1).

The last pointer, read from RT(Nst−1), is used to address a cluster Cj within another memory, called SST. The SST stores the <<active>> incoming address values (i.e. the addresses handled by the structure), spread in the right cluster.

Normally, the SST memory has a size different from the one that hosts the DAT and the RTi.

The Clustered Sequential Search Algorithm has Nmem=2.

A sequential search, from the first to the last location belonging to cluster Cj, is performed. If the incoming address is equal to the data stored in the SST, the address of the SST itself is validated as the corresponding Compressed Identifier.

As far as the depth of the SST is concerned, there are $2^{Cn}$ clusters, each $2^{Cs}$ deep. The overall depth SST is $2^{Ncpr}$. Therefore, it may be stated that:

$$2^{Cn} * 2^{Cs} = 2^{Ncpr} \quad (2)$$

and $$Ncpr = Cn + Cs \quad (4)$$

These relationships give the size of SST:

$$SSTsize = N * 2^{Ncpr} \quad (5)$$

Of course the rules stemming from the <<maximum spread>> approach and identified in paragraph 4, must be applied to RTi.

In $RT_i$ (i∈1, Nst−1) Cn <<pages>> are addressed by the value stored in $RTM_{i-1}$. Within a <>, Cs locations are needed, in order to prevent a blocking condition. The stored value is Cn bit wide. This give the $RTM_i$ size.

$$RT_i size = Cn * 2^{Ncpr} \text{ with } (i \in 1, Nst-1) \quad (6)$$

The first bank, DAT, performs a flat addressing function between the W0 vector and the first pointer which is Cn bits wide. To minimize the total needed memory, the depth of DAT must be less or equal to the depth of the other memories constituting the $RT_i$. In fact, $$W0 \leq (Cn + Cs) = Ncpr \quad (7)$$

moreover $$N = W0 + (Nst-1) * Cs \quad (8)$$

combining the (5) and the (6) we have $$Nst \geq (N - Ncpr + Cs)/Cs \quad (9)$$

thus verifying $$Nst = \text{ceil}((N - Ncpr + Cs)/Cs) \quad (10)$$

The equation (10) is used to determine Msize by using Cs as a free parameter. In the following tables the relative values of Cs and Ncpr are shown.

TABLE 14

Nst for <<ATM>> scenario performing Clustered Sequential search

For <<ATM>> scenario (N = 24):

| Ncpr \ Cs | 2  | 3 | 4 | 5 | 6 |
|---|---|---|---|---|---|
| 2  | 12 | 9 | 7 | 6 | 5 |
| 3  | 12 | 8 | 7 | 6 | 5 |
| 4  | 11 | 8 | 6 | 5 | 5 |
| 5  | 11 | 8 | 6 | 5 | 5 |
| 6  | 10 | 7 | 6 | 5 | 4 |
| 7  | 10 | 7 | 6 | 5 | 4 |
| 8  | 9  | 7 | 5 | 5 | 4 |
| 9  | 9  | 6 | 5 | 4 | 4 |
| 10 | 8  | 6 | 5 | 4 | 4 |
| 11 | 8  | 6 | 5 | 4 | 4 |
| 12 | 7  | 5 | 4 | 4 | 3 |
| 13 | 7  | 5 | 4 | 4 | 3 |
| 14 | 6  | 5 | 4 | 3 | 3 |
| 15 | 6  | 4 | 4 | 3 | 3 |
| 16 | 5  | 4 | 3 | 3 | 3 |

TABLE 15

Nst for <<IP>> scenario performing Clustered Sequential search

For <<IP>> scenario (N = 32):

| Ncpr \ Cs | 2  | 3  | 4 | 5 | 6 |
|---|---|---|---|---|---|
| 2  | 16 | 11 | 9 | 7 | 6 |
| 3  | 16 | 11 | 9 | 7 | 6 |
| 4  | 15 | 11 | 8 | 7 | 6 |
| 5  | 15 | 10 | 8 | 7 | 6 |
| 6  | 14 | 10 | 8 | 7 | 6 |
| 7  | 14 | 10 | 8 | 6 | 6 |
| 8  | 13 | 9  | 7 | 6 | 5 |
| 9  | 13 | 9  | 7 | 6 | 5 |
| 10 | 12 | 9  | 7 | 6 | 5 |
| 11 | 12 | 8  | 7 | 6 | 5 |
| 12 | 11 | 8  | 6 | 5 | 5 |
| 13 | 11 | 8  | 6 | 5 | 5 |
| 14 | 10 | 7  | 6 | 5 | 4 |
| 15 | 10 | 7  | 6 | 5 | 4 |
| 16 | 9  | 7  | 5 | 5 | 4 |

The shaded values reflect a situation where $Ncpr \leq Cs$
The number of clock cycles needed is $$Nclk = 2 \cdot Nst + 2^{Cs} \quad (11)$$

The <<2>> factor appears because the address used to access the <<next>> memory bank is written in the <<actual>>: a clock cycle is needed to read the <<actual>> and to prepare the address for the <<next>>. During SST search only a clock cycle per address is needed.

The follwing tables show the relation values of Cs and Ncpr.

TABLE 16

Nclk for <<ATM>> scenario performing Clustered Sequential search

For <<ATM>> scenario (W = 24):

| Ncpr \ Cs | 2 | 3 | 4 | 5 | 6 |
|---|---|---|---|---|---|
| 2 | 28 | 26 | 30 | 44 | 74 |
| 3 | 28 | 24 | 30 | 44 | 74 |
| 4 | 26 | 24 | 28 | 42 | 74 |
| 5 | 26 | 24 | 28 | 42 | 74 |
| 6 | 24 | 22 | 28 | 42 | 72 |
| 7 | 24 | 22 | 28 | 42 | 72 |
| 8 | 22 | 22 | 26 | 42 | 72 |
| 9 | 22 | 20 | 26 | 40 | 72 |
| 10 | 20 | 20 | 26 | 40 | 72 |
| 11 | 20 | 20 | 26 | 40 | 72 |
| 12 | 18 | 18 | 24 | 40 | 70 |
| 13 | 18 | 18 | 24 | 40 | 70 |
| 14 | 16 | 18 | 24 | 38 | 70 |
| 15 | 16 | 16 | 24 | 38 | 70 |
| 16 | 14 | 16 | 22 | 38 | 70 |

TABLE 17

Nclk for <<IP>> scenario performing Clustered Sequential search

For <<IP>> scenario (W = 32):

| Ncpr \ Cs | 2 | 3 | 4 | 5 | 6 |
|---|---|---|---|---|---|
| 2 | 36 | 30 | 34 | 46 | 76 |
| 3 | 36 | 30 | 34 | 46 | 76 |
| 4 | 34 | 30 | 32 | 46 | 76 |
| 5 | 34 | 28 | 32 | 46 | 76 |
| 6 | 32 | 28 | 32 | 46 | 76 |
| 7 | 32 | 28 | 32 | 44 | 76 |
| 8 | 30 | 26 | 30 | 44 | 74 |
| 9 | 30 | 26 | 30 | 44 | 74 |
| 10 | 28 | 26 | 30 | 44 | 74 |
| 11 | 28 | 24 | 30 | 44 | 74 |
| 12 | 26 | 24 | 28 | 42 | 74 |
| 13 | 26 | 24 | 28 | 42 | 74 |
| 14 | 24 | 22 | 28 | 42 | 72 |
| 15 | 24 | 22 | 28 | 42 | 72 |
| 16 | 22 | 22 | 26 | 42 | 72 |

The two tables show that the CSS technique can be applied only with small Cs values, 3 or 4. (this means clusters with 8, 16 locations)

The performance is $$M\text{size} = Cn*2^{W0} + (Nst-1)*Cn*2^{Ncpr} + W*2^{Ncpr} \quad (12)$$

Table 18 and Table 19 show the results of the above equation.

$$M\text{size} = F(N, Ncpr, Cs).$$

In the last two columns the best performance value for Msize(N, Cs) is pointed out together with the related value of Cs.

TABLE 18

Msize as function of Cs and Ncpr in ATM scenario

| Ncpr \ Cs | 2 | 3 | 4 | 5 | 6 | Msize | Cs |
|---|---|---|---|---|---|---|---|
| 2 | 96 | 63 | 46 | 34.5 | 28 | n.a. | n.a. |
| 3 | 284 | 192 | 143 | 111 | 93 | n.a. | n.a. |
| 4 | 736 | 504 | 384 | 304 | 254 | 504 | 3 |
| 5 | 1776 | 1232 | 944 | 768 | 639 | 1232 | 3 |
| 6 | 4096 | 2880 | 2208 | 1808 | 1536 | 2880 | 3 |
| 7 | 9152 | 6400 | 5040 | 4128 | 3520 | 6400 | 3 |
| 8 | 19968 | 14144 | 11264 | 9264 | 7808 | 11264 | 4 |
| 9 | 42752 | 30720 | 23808 | 20480 | 17088 | 23808 | 4 |
| 10 | 90112 | 64000 | 50688 | 42496 | 37120 | 50688 | 4 |
| 11 | 187392 | 135168 | 108288 | 39936 | 31040 | 108288 | 4 |
| 12 | 385024 | 282624 | 229376 | 187904 | 172032 | 229376 | 4 |
| 13 | 782336 | 565248 | 454656 | 397312 | 339968 | 454656 | 4 |
| 14 | 1572864 | 1159168 | 925696 | 835584 | 688128 | 925696 | 4 |
| 15 | 3129344 | 2359296 | 1912832 | 1605632 | 1413120 | 1912832 | 4 |
| 16 | 6160384 | 4554752 | 3932160 | 3194880 | 2924544 | 3932160 | 4 |

TABLE 19

Msize as function of Cs and Ncpr in IP scenario

| Ncpr \ Cs | 2 | 3 | 4 | 5 | 6 | Msize | Cs |
|---|---|---|---|---|---|---|---|
| 2 | 128 | 84 | 62 | 44 | 32 | n.a. | n.a. |
| 3 | 380 | 256 | 191 | 152 | 124 | n.a. | n.a. |
| 4 | 992 | 676 | 512 | 412 | 344 | 676 | 3 |
| 5 | 2416 | 1664 | 1264 | 1024 | 860 | 1664 | 3 |
| 6 | 5632 | 3872 | 2976 | 2436 | 2048 | 3872 | 3 |
| 7 | 12736 | 8832 | 6832 | 5632 | 4740 | 8832 | 3 |
| 8 | 28160 | 19712 | 15360 | 12416 | 10752 | 15360 | 4 |
| 9 | 61184 | 42496 | 33024 | 27136 | 23296 | 33024 | 4 |
| 10 | 131072 | 91904 | 71168 | 59008 | 50176 | 71168 | 4 |
| 11 | 277504 | 196608 | 153344 | 62208 | 42240 | 153344 | 4 |
| 12 | 581632 | 407552 | 327680 | 274432 | 230912 | 327680 | 4 |
| 13 | 1208320 | 856064 | 667648 | 557056 | 493312 | 667648 | 4 |
| 14 | 2490368 | 1785856 | 1384448 | 1150976 | 1048576 | 1384448 | 4 |
| 15 | 5095424 | 3604480 | 2895872 | 2400256 | 2080768 | 2895872 | 4 |
| 16 | 10354688 | 7421952 | 6029312 | 5025792 | 4227072 | 6029312 | 4 |

These are the overall performance values of the Clustered Sequential Search Algorithm of the invention.

Two physical memories are needed (Nmem=2): the first hosting the DAT and the plurality of RTi banks, the second the SST.

The method of the invention can be implemented with different Ncpr values. The method remains valid as long as Ncpr is extremely small (2,3).

In the range Ncpr ∈ (8,16) the addressed cluster size is 4 (that means a cluster with 16 positions).

The practicable conditions are resumed in the following tables.

TABLE 20

Msize for <<ATM>> scenario performing Clustered Sequential search For <<ATM>> scenario (N = 24):

| Ncpr | Nclk | Msize | Cs |
|---|---|---|---|
| 2 | 16 | n.a. | n.a. |
| 3 | 16 | n.a. | n.a. |

TABLE 20-continued

Msize for <<ATM>>
scenario performing Clustered
Sequential search
For <<ATM>> scenario (N = 24):

| Ncpr | Nclk | Msize | Cs |
|---|---|---|---|
| 4 | 24 | 504 | 3 |
| 5 | 24 | 1232 | 3 |
| 6 | 22 | 2880 | 3 |
| 7 | 26 | 6400 | 3 |
| 8 | 26 | 11264 | 4 |
| 9 | 26 | 23808 | 4 |
| 10 | 26 | 50688 | 4 |
| 11 | 26 | 108288 | 4 |
| 12 | 24 | 229376 | 4 |
| 13 | 24 | 454656 | 4 |
| 14 | 24 | 925696 | 4 |
| 15 | 24 | 1912832 | 4 |
| 16 | 22 | 3932160 | 4 |

TABLE 21

Msize for <<IP>> scenario
performing Clustered Sequential
search
For <<IP>> scenario (N = 32):

| Ncpr | Nclk | Msize | Cs |
|---|---|---|---|
| 2 | 16 | n.a. | n.a. |
| 3 | 16 | n.a. | n.a. |
| 4 | 16 | 676 | 3 |
| 5 | 14 | 1664 | 3 |
| 6 | 14 | 3872 | 3 |
| 7 | 14 | 8832 | 3 |
| 8 | 16 | 15360 | 4 |
| 9 | 16 | 33024 | 4 |
| 10 | 16 | 71168 | 4 |
| 11 | 14 | 153344 | 4 |
| 12 | 14 | 327680 | 4 |
| 13 | 14 | 667648 | 4 |
| 14 | 12 | 1384448 | 4 |
| 15 | 12 | 2895872 | 4 |
| 16 | 16 | 6029312 | 4 |

Of course, performing the sequential search on different SSMs, in parallel, (as in an Extended Sequential Search), it is possible to accept larger Cs values without increasing Nclk. In an embodiment of that kind, Msize can be reduced further.

3.3.6 Overall Performance Comparison

Table 22 and Table 23 shows a comparison between the various known techniques and the CSSA technique of the invention for the <<ATM>> scenario table 23 shows or <<IP>> scenario.

TABLE 22

Msize for 21 <ATM>> scenario comparison (bits)

| Ncpr | CAM | Pure seq | Ext. Seq | Binary Tree | Clustered Seq |
|---|---|---|---|---|---|
| 2 | 96 | 96 | 96 | 792 | n.a |
| 3 | 192 | 192 | 192 | 2048 | n.a |
| 4 | 384 | 384 | 384 | 4800 | 504 |
| 5 | 768 | n.a. | 768 | 11136 | 1232 |
| 6 | 1536 | n.a. | 1536 | 25088 | 2880 |
| 7 | 3072 | n.a. | 3072 | 53248 | 6400 |
| 8 | 6144 | n.a. | 6144 | 82944 | 11264 |
| 9 | 12288 | n.a. | n.a. | 174080 | 23808 |
| 10 | 24576 | n.a. | n.a. | 360448 | 50688 |
| 11 | 49152 | n.a. | n.a. | 737280 | 108288 |

TABLE 22-continued

Msize for 21 <ATM>> scenario comparison (bits)

| Ncpr | CAM | Pure seq | Ext. Seq | Binary Tree | Clustered Seq |
|---|---|---|---|---|---|
| 12 | 98304 | n.a. | n.a. | 1490944 | 229376 |
| 13 | 196608 | n.a. | n.a. | 2981888 | 454656 |
| 14 | 393216 | n.a. | n.a. | 5898240 | 925696 |
| 15 | 786432 | n.a. | n.a. | 11534336 | 1912832 |
| 16 | 1572864 | n.a. | n.a. | 20054016 | 3932160 |

TABLE 23

Msize for <<IP>> scenario comparison (bits)

| Ncpr | CAM | Pure seq | Ext. Seq | Binary Tree | Clustered Seq |
|---|---|---|---|---|---|
| 2 | 128 | 128 | 128 | 1584 | n.a |
| 3 | 256 | 256 | 258 | 4160 | n.a |
| 4 | 512 | 512 | 512 | 10240 | 676 |
| 5 | 1024 | 1024 | 1024 | 23040 | 1664 |
| 6 | 2048 | n.a. | 2048 | 51968 | 3872 |
| 7 | 4096 | n.a. | 4096 | 116736 | 8832 |
| 8 | 8192 | n.a. | 8192 | 165888 | 15360 |
| 9 | 16384 | n.a. | 16384 | 348160 | 33024 |
| 10 | 32768 | n.a. | n.a. | 743424 | 71168 |
| 11 | 65536 | n.a. | n.a. | 1572864 | 153344 |
| 12 | 131072 | n.a. | n.a. | 3194880 | 327680 |
| 13 | 262144 | n.a. | n.a. | 6651904 | 667648 |
| 14 | 524288 | n.a. | n.a. | 13762560 | 1384448 |
| 15 | 1048576 | n.a. | n.a. | 27262976 | 2895872 |
| 16 | 2097152 | n.a. | n.a. | 40108032 | 6029312 |

The technique that covers the entire Ncpr field with the smallest Msize is obviously the CAM, but in this case there are serious problems of implementation, especially for relatively large Ncpr values; moreover it must be remember that Msize given in terms of <<CAM>> bits, which are memory structures for more complex than ordinary <<RAM>> structures.

The areas applicability of a sequential search algorithm (pure or extended) cover only relatively small Ncpr values. On the other hand, the Msize requisite is minimum. This approach may remain a candidate in equipment that needs a limited number of channels (up to 512).

The classical Binary Tree search and the Clustered Sequential Search of the present invention appear to be the only two techniques capable of covering the entire spectrum of applications. However, by looking to the proceeding tables, it is clear that the memory needed for implementing the CSS is far less than the memory needed for a classical Binary Tree search.

TABLE 24

Binary tree Vs CSSA for
<<ATM>> scenario comparison
For <<ATM>> scenario (W = 24):

| Ncpr | BT/CAM | CSS/CAM | ratio % |
|---|---|---|---|
| 2 | 8.25 | N.A. | N.A. |
| 3 | 10.66 | N.A. | N.A. |
| 4 | 12.5 | 1.31 | 954 |
| 5 | 14.5 | 1.6 | 906 |
| 6 | 16.33 | 1.87 | 873 |
| 7 | 17.33 | 2.08 | 833 |
| 8 | 13.5 | 1.83 | 737 |
| 9 | 14.16 | 1.93 | 733 |
| 10 | 14.66 | 2.06 | 711 |
| 11 | 15 | 2.2 | 681 |

TABLE 24-continued

Binary tree Vs CSSA for
<<ATM>> scenario comparison
For <<ATM>> scenario (W = 24):

| Ncpr | BT/CAM | CSS/CAM | ratio % |
|---|---|---|---|
| 12 | 15.16 | 2.33 | 650 |
| 13 | 15.16 | 2.31 | 656 |
| 14 | 15 | 2.35 | 638 |
| 15 | 14.66 | 2.43 | 603 |
| 16 | 12.75 | 2.5 | 510 |

TABLE 25

Binary tree Vs CSSA for
<<IP>> scenario comparison
For <<IP>> scenario (W = 32):

| Ncpr | BT/CAM | CSS/CAM | Ratio % |
|---|---|---|---|
| 2 | 12.37 | N.A. | N.A. |
| 3 | 16.25 | N.A. | N.A. |
| 4 | 20 | 1.32 | 1515 |
| 5 | 22.5 | 1.62 | 1388 |
| 6 | 25.37 | 1.89 | 1342 |
| 7 | 28.5 | 2.15 | 1325 |
| 8 | 20.25 | 1.87 | 1082 |
| 9 | 21.25 | 2.01 | 1057 |
| 10 | 22.68 | 2.17 | 1045 |
| 11 | 24 | 2.33 | 1030 |
| 12 | 24.37 | 2.5 | 974 |
| 13 | 25.37 | 2.54 | 998 |
| 14 | 26.25 | 2.64 | 994 |
| 15 | 26 | 2.76 | 942 |
| 16 | 19.12 | 2.87 | 666 |

In the previous tables, the Msize value for the CSS and for the Binary Tree is normalized in respect to a CAM Msize. Then the normalized BT value is divided by the correct normalized CSS value. This produces an indication of the gain obtained in applying the CSS technique instead of the BT. As can be readily appreciated, the gain ranges from nine to five times in an ATM scenario, and from 15 to six in an IP scenario.

This means that, for Ncpr greater than 8 or 9, the Clustered Sequential Search technique of the invention is the technique that gives by far the best overall performance.

Moreover, with the CSS it is possible to markedly the reduce cost of implementation.

For example, in the ATM scenario, with Ncpr=12 (4096 entries), the needed memory for a Binary Tree is 1491 Kbits and for the CSS is 229 Kbits.

If the address compression function is implemented by way of an ASIC, if the Binary Tree technique is used it may be necessary to employ an external memory. This can be avoided by using the CSSA: technique of this invention, thus reducing the pin requirement.

What is claimed is:

1. A method of address compression for a data stream structured in packets or cells, each including a destination identifier consisting of a string of N bits (INCVECT) constituting an address space (U) of size $2^N$, consisting in an algorithm, executable in a predictable time span, mapping $2^{Ncpr}$ points of said address space (U) belonging to a subset (S) of identifiers to be compressed to a unique string of Ncpr bits, constituting a compressed address space (C) of size $2^{Ncpr}$ where Ncpr<N, characterized in that the method comprises the steps of:

a) splitting said address space (U) of incoming N-bit identifiers into a plurality of subspaces by the use of a direct addressing table (DAT), a row of which is pointed by a first predefined slice of the incoming N-bit identifier (INCVECT) for outputting a first pointer datum;

b) clustering said subset (S) of N-bit identifiers contained in said subspaces by the use of a plurality of routing tables (RTi), the tables being coupled in a cascade, a page of the first table (RTI) being pointed by said first pointer datum and the row of the pointed page being selected by a predefined second slice of the incoming N-bit identifier (INCVECT), for outputting a second pointer datum, a page of each of the following tables of the cascade being pointed by the pointer datum output by the preceding table and the row of the pointed page being selected by a respective predefined slice of the incoming N-bit identifier (INCVECT), for outputting from the last routing table (RTn) a final pointer datum, thus identifying a series of clusters located in at least a sequential search table (SST), each cluster smaller or equal to a predefined number (SSLL) and storing only points of said subsets that belong to the said subset (S);

c) performing, on a cluster of said first subset (S), having a size equivalent to said predefined number (SSLL) as defined in, step b), a sequential search in at least a table (SST), said table being organized in pages, each page corresponding to a cluster, composed by a number of rows equal to said predefined number (SSLL), within a given packet or cell time slot, by pointing, with the pointer datum outputted by the last one of said routing tables (RTi) in cascade, a page on which said sequential search is performed;

d) said pointer datum outputted by the last routing table, concatenated with the row index datum of the selected page of said sequential search table (SST) or plurality of tables, verifying the match with incoming N-bit identifier (INCVECT) constituting said compressed address of Ncpr bits.

2. The method according to claim 1, wherein said subsets in which said address space (U) is split have identical size and all routing tables (RTi) of said plurality are organized in the same number of pages.

3. The method according to claim 1, wherein more then one sequential search table (SST) with the same number of pages are used, the same pointer datum output by the last one of said routing tables (RTi) in cascade, pointing a page of each sequential search table (SSTj) and the sequential search being performed in parallel on all the selected pages of the sequential search tables (SSTj), until the content of row of any of the sequential search tables, searched in parallel, verifies the match with said incoming N-bit identifier (INCVECT).

4. The method according to claim 1, wherein each row of the sequential search table (SST) is adopted to store a predetermined number of vectors (OUTVECT) to be matched with said incoming N-bit identifier (INCVECT).

5. The methods as described in claim 1, wherein the steps a) and b) are performed during a single cell (packet) period, and the step c) is performed during the successive, cell (packet) period, in a pipelined arrangement.

6. A method of address compression for a data stream structured in packets or cells, each including a destination identifier consisting of a string of N bits (INCVECT) constituting an address space (U) of size $2^N$, consisting in an algorithm, executable in a predictable time span, mapping different points or domains of said address space (U) belonging to a certain number (Nclasses) of subsets ($S_1$, $S_2$, $S_j$, $S_{Nclasses}$) of identifiers to be compressed to a number of strings, being said number equal to the said number of subsets (Nclasses), these strings constituting different compressed address spaces ($C_1$, $C_2$, $C_j$, $C_{Nclasses}$), characterized in that the method comprises the steps of:

a) splitting said address space (U) of incoming N-bit identifiers into a plurality of subspaces by the use of a direct addressing table (DAT), a row of which is pointed by a first predefined slice of the incoming N-bit identifier (INCVECT) for outputting a first pointer datum;

b) clustering said subsets ($S_1$, $S_2$, $S_j$, $S_{Nclasses}$) of N-bit identifiers contained in said subspaces by the use of a plurality of routing tables ($RT_{ij}$), the tables being organized in a tree, a page of the first table ($RT_{11}$) being pointed by said first pointer datum and the row of the pointed page being selected by a predefined second slice of the incoming N-bit identifier (INCVECT), for outputting a second pointer datum, used to point a page of the following tables of the cascade ($RT_{12}$) if the same subset $S_1$ has to be clustered or to point to at least two different tables ($RT_{21}$, and $RT_{22}$, ...), downstream of a branching of said tree, if different subsets must be clustered to different compressed address spaces, for selecting, by means of a predefined slice of the incoming N-bit identifier (INCVECT), at least two different pointer data suitable to point to a next stage of Routing Table of said tree (RTij), and so forth until all bits of the incoming N-bit identifier (INCVECT), have been utilized, outputting from the last pointed routing tables (RTnj) a plurality of final pointer data ($CLID_1$, $CLID_2$, $CLID_j$, $CLID_{Nclasses}$) identifying as many clusters in different sequential search tables ($SST_1$, $SST_2$, $SST_j$, $SST_{Nclasses}$) each organized in pages composed by a number of rows equal to said predefined number ($SSLL_j$), each page corresponding to a cluster, and each sequential search table corresponding to points or domains or subsets $S_j$ belonging to said address space (U), each cluster being smaller of or equal to said predefined number of rows ($SSLL_1$, $SSLL_2$, $SSLL_j$, $SSLL_{Nclasses}$) and storing only points belonging to the said subset of N-bit identifiers ($S_1$, $S_2$, $S_j$, $S_{Nclasses}$) which map to the corresponding said ($C_1$, $C_2$, $C_j$, $C_{Nclasses}$) subsets of compressed addresses.

c) performing, on the clusters belonging to each sequential search table ($SST_1$, $SST_2$, $SST_j$, $SST_{Nclasses}$) pointed by said final pointer data ($CLID_1$, $CLID_2$, $CLID_j$, $CLID_{Nclasses}$) a sequential search by means of different address generators, one for each sequential search table, verifying the match of the data stored in said sequential search tables ($OUTVECT_j$) with said incoming N-bit identifier (INCVECT), identifying said compressed addresses subsets ($C_1$, $C_2$, $C_j$, $C_{Nclasses}$) of compressed addresses.

7. A data processing structure for performing address compression for a data stream structured in packets or cells, each including a destination identifier consisting of a string of N bits (INCVECT) constituting an address space (U) of $2^N$ size, by mapping in a predictable time span $2^{Ncpr}$ points of said address space (U) belonging to a subset (S) of identifiers to be compressed to a unique string of Ncpr bits constituting a compressed address space (C) of size $2^{Ncpr}$ where Ncpr<N, the structure receiving an incoming N-bit identifier (INCVECT) belonging to said address space (U) containing unique address information upon verifying a match of the destination information contained in the N-bit incoming identifier (INCVECT) with an outcoming N-bit vector (OUTVECT) among a plurality of $2^{Ncpr}$ elements, each one in direct relationship with a compressed address, characterized that it comprises a) a direct addressing table (DAT) to which a first predefined slice of said incoming N-bit identifier (INCVECT) is inputted, pointing a row of said table for outputting a first pointer datum;

b) a cascade of routing tables (RT1, ..., RTn), the first of which is coupled in cascade to said direct addressing table (DAT), each organized in selectable pages that are pointed by the pointer datum of the preceding table in the cascade, the first table of the cascade (RT1) having a page pointed by said first pointer datum outputted by said direct addressing table (DAT), and a row of the thus pointed page of all routing tables of the cascade being pointed by respective slices of said incoming N-bit identifier (INCVECT), which is inputted to each routing table;

c) at least a sequential search table (SST) organized in a plurality if pages, or clusters, pointed by the datum outputted by the last table (RTn) of said cascade of routing tables;

d) validation means (=) verifying the coincidence of the destination information contained in said incoming N-bit identifiers (INCVECT) with the information contained in the sequentially searched rows (OUTVECT) of the pointed page of said sequential search table (SST) or plurality of tables.

8. The data processing structure of claim 7, characterized in that all said routing tables (RTi) of said cascade are organized in the same number of pages.

9. The data processing structure of claim 7, characterized in that it includes two or more sequential search tables (SST) organized in the same number of pages pointed by the same datum outputted by the last table (RTn) of said cascade of routing tables and searched simultaneously in parallel.

10. The data processing structure of claim 7, characterized in that it includes a sequential search table (SST) in which each row hosts more than one vector (OUTVECT) to be matched with said incoming N-bit identifier (INCVECT).

11. The data processing structures as described in claim 7, characterized in that the operations performed by said direct addressing table (DAT) and the operations performed by said cascade of routing tables (RT1, ..., RTn) are executed during a single cell (packet) period, and the operations performed by said at least one sequential search table (SST) are executed during the successive cell (packet) period, said direct addressing table (DAT) and said tree of routing tables ($RT_{ij}$), and said sequential search table ($SST_j$) are organized in a pipeline employing two first-in-first-out registers two cells at the time.

12. A data processing structure for performing address compression for a data stream structured in packets or cells, each including a destination identifier consisting of a string of N bits (INCVECT) constituting an address space (U) of size $2^N$, by mapping in a predictable time span different points or domains of said address space (U) belonging to Nclasses subsets ($S_1$, $S_2$, $S_j$, $S_{Nclasses}$) of identifiers to be compressed to M string of at least Ncpr bits, constituting different compressed address spaces ($C_1$, $C_2$, $C_j$, $C_{Nclasses}$), the structure receiving an incoming N-bit identifier (INCVECT) belonging to said address space (U) containing unique address information upon verifying a match of the destination information contained in the N-bit incoming identifier (INCVECT) with Nclasses of N-bit vectors ($OUTVECT_j$) among a plurality of elements, each one in direct relationship with a compressed address, characterized that it comprises a) a direct addressing table (DAT) to which a first predefined slice of said incoming N-bit identifier (INCVECT) is inputted, pointing a row of said table for outputting a first pointer datum;

b) a tree of routing tables ($RT_{11}, \ldots, RT_{ij}, \ldots, RT_{nNclasses}$), the first of which is coupled in cascade to said direct addressing table,(DAT), each routing table being organized in selectable pages that are pointed by pointer data outputted by preceding tables in the tree-like cascade, the first table of the tree-like cascade (RT11) having a page pointed by said first pointer datum outputted by said direct addressing table (DAT), and pointing to a chain of routing tables or branching to at least two chains, a row of the thus pointed page of all routing tables of the tree-like cascade being pointed by respective slices of said incoming N-bit identifier (INCVECT), which is inputted to each routing table, the last routing table ($RT_{nj}$) of each branch in said tree-like cascade generating a final pointer datum ($CLID_1, CLID_2, CLID_j, CLID_{Nclasses}$);

c) at least Nclasses of sequential search tables ($SST_j$), each table being organized in a plurality of pages, or clusters, pointed by the datum outputted by the last table ($CLID_j$) of said tree-like cascade of routing tables;

d) validation means (=) verifying the coincidence of the destination information contained in said incoming N-bit identifier (INCVECT) with the data ($OUTVECT_j$) contained in the pages, belonging to said sequential search table ($SST_j$), pointed by final pointer data ($CLID_1, CLID_2, CLID_j, CLID_{Nclasses}$) generated by said last routing table ($RT_{nj}$) of each branch in said tree-like cascade.

\* \* \* \* \*